(12) United States Patent
Miyamoto et al.

(10) Patent No.: US 9,251,316 B2
(45) Date of Patent: Feb. 2, 2016

(54) CONTENT SHARING SYSTEM, INFORMATION COMMUNICATION APPARATUS, CONTENT SHARING METHOD, AND COMMUNICATION METHOD

(71) Applicant: PANASONIC INTELLECTUAL PROPERTY CORPORATION OF AMERICA, Torrance, CA (US)

(72) Inventors: Shingo Miyamoto, Hyogo (JP); Keiji Icho, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 134 days.

(21) Appl. No.: 14/006,700

(22) PCT Filed: Mar. 6, 2013

(86) PCT No.: PCT/JP2013/001393
§ 371 (c)(1),
(2) Date: Sep. 23, 2013

(87) PCT Pub. No.: WO2013/136723
PCT Pub. Date: Sep. 19, 2013

(65) Prior Publication Data
US 2014/0020059 A1    Jan. 16, 2014

(30) Foreign Application Priority Data
Mar. 15, 2012  (JP) .................................. 2012-059268

(51) Int. Cl.
*H04L 29/06* (2006.01)
*G06F 21/00* (2013.01)
(Continued)

(52) U.S. Cl.
CPC ................ *G06F 21/00* (2013.01); *G06F 12/00* (2013.01); *G06F 13/00* (2013.01); *G06F 21/30* (2013.01); *G06F 21/31* (2013.01); *G06F 21/62* (2013.01)

(58) Field of Classification Search
CPC ......... G06F 21/00; G06F 21/30; G06F 12/00; G06F 21/31; G06F 13/00; G06F 21/62
See application file for complete search history.

(56) References Cited

U.S. PATENT DOCUMENTS

2010/0177696 A1*  7/2010  Jung et al. ...................... 370/328
2011/0218996 A1*  9/2011  Jin et al. ......................... 707/737
(Continued)

FOREIGN PATENT DOCUMENTS

JP    2002-132616    5/2002
JP    2004-259161    9/2004
(Continued)

OTHER PUBLICATIONS

International Search Report issued Apr. 2, 2013 in International (PCT) Application No. PCT/JP2013/001393.

*Primary Examiner* — Jeffrey Pwu
*Assistant Examiner* — William Corum, Jr.
(74) *Attorney, Agent, or Firm* — Wenderoth, Lind & Ponack, L.L.P.

(57) ABSTRACT

When a user who shares content is selected in a first information communication apparatus used by one of the users who share content, sharing space securement information for the selected user is generated and transmitted to the server. When sharing space connection information for accessing a sharing space, which is generated by the server based on the sharing space securement information, is received by the first information communication apparatus, the sharing space connection information transmitted to the second information communication apparatus used by the user who share the content.

12 Claims, 15 Drawing Sheets

(51) Int. Cl.
*G06F 12/00* (2006.01)
*G06F 13/00* (2006.01)
*G06F 21/31* (2013.01)
*G06F 21/62* (2013.01)
*G06F 21/30* (2013.01)

(56) References Cited

U.S. PATENT DOCUMENTS

2012/0324544 A1* 12/2012 Kanetomo ............... 726/4
2013/0046833 A1* 2/2013 Riepling et al. ............ 709/206
2014/0245349 A1* 8/2014 Kim et al. ................. 725/32

FOREIGN PATENT DOCUMENTS

| JP | 2005-084723 | 3/2005 |
| JP | 2008-197746 | 8/2008 |
| JP | 2011-070305 | 4/2011 |
| JP | 2011-101403 | 5/2011 |
| JP | 2011-138193 | 7/2011 |

* cited by examiner

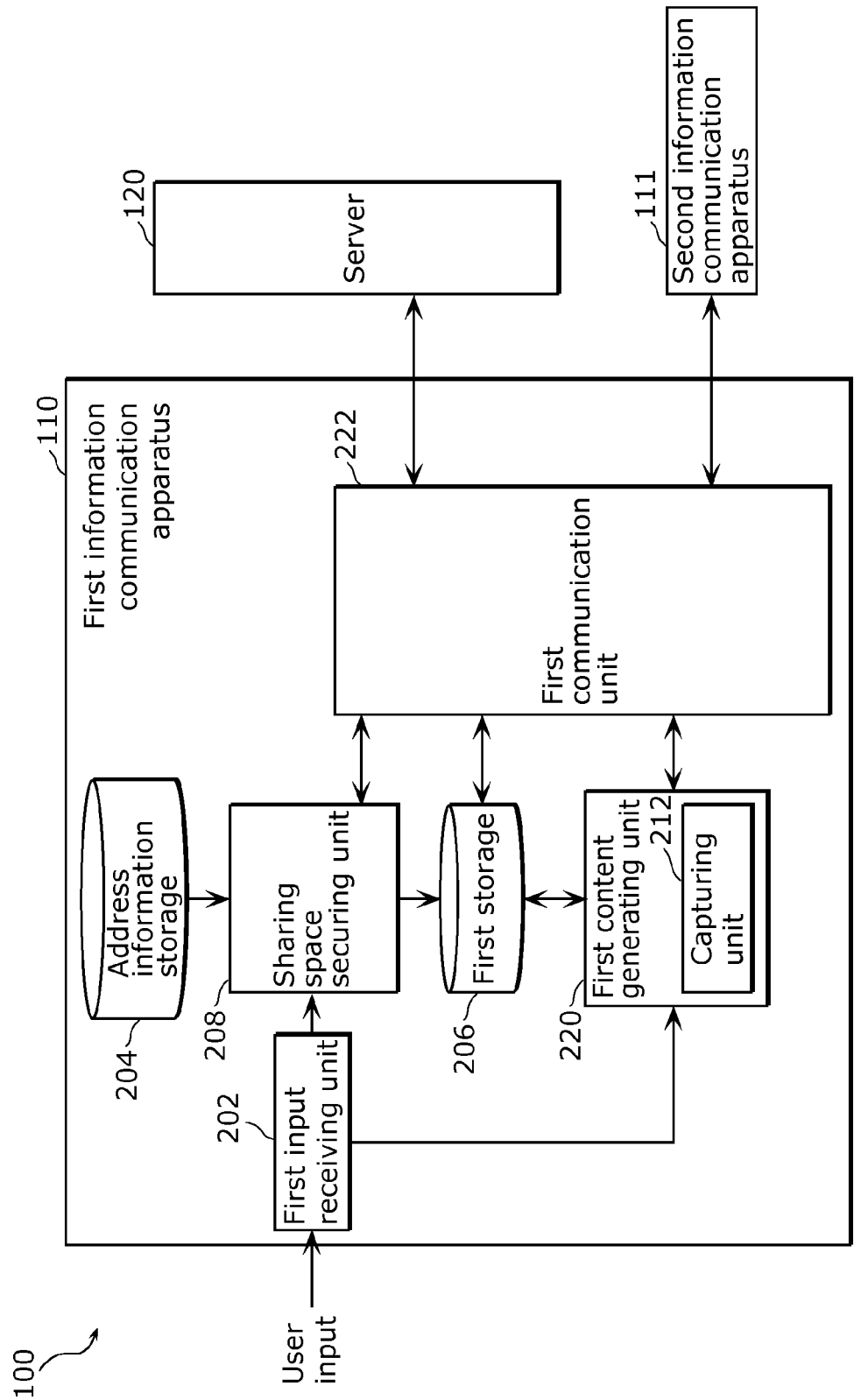

FIG. 2B

| Address information | Authentication information | |
|---|---|---|
| | Account | Password |
| daihyou@xyz.·· | abcde | ****** | ← Authentication information of the first information communication apparatus 110 (representative user)
| sanka1@abc·· | fghij | ++++++ | ← Authentication information of the second information communication apparatus 111 (participating user 1)
| sanka2@def·· | klmnopq | ------ | ← Authentication information of the second information communication apparatus 111 (participating user 2)
| sanka3@ghi·· | rstuvwxyz | ~~~~~~ | ← Authentication information of the second information communication apparatus 111 (participating user 3)
| ... | ... | ... |

FIG. 3B

```
From:daihyou@xyz.···
To:sanka1@abc···
Subject: Content sharing
-------------------------------
Dear Participating user 1
Address of the sharing space is as follows
URL:http:xxx.kyouyuu.yyy
Account:fghij
Password:++++++
```

Sharing space address information: URL:http:xxx.kyouyuu.yyy

Authentication information: Account:fghij, Password:++++++

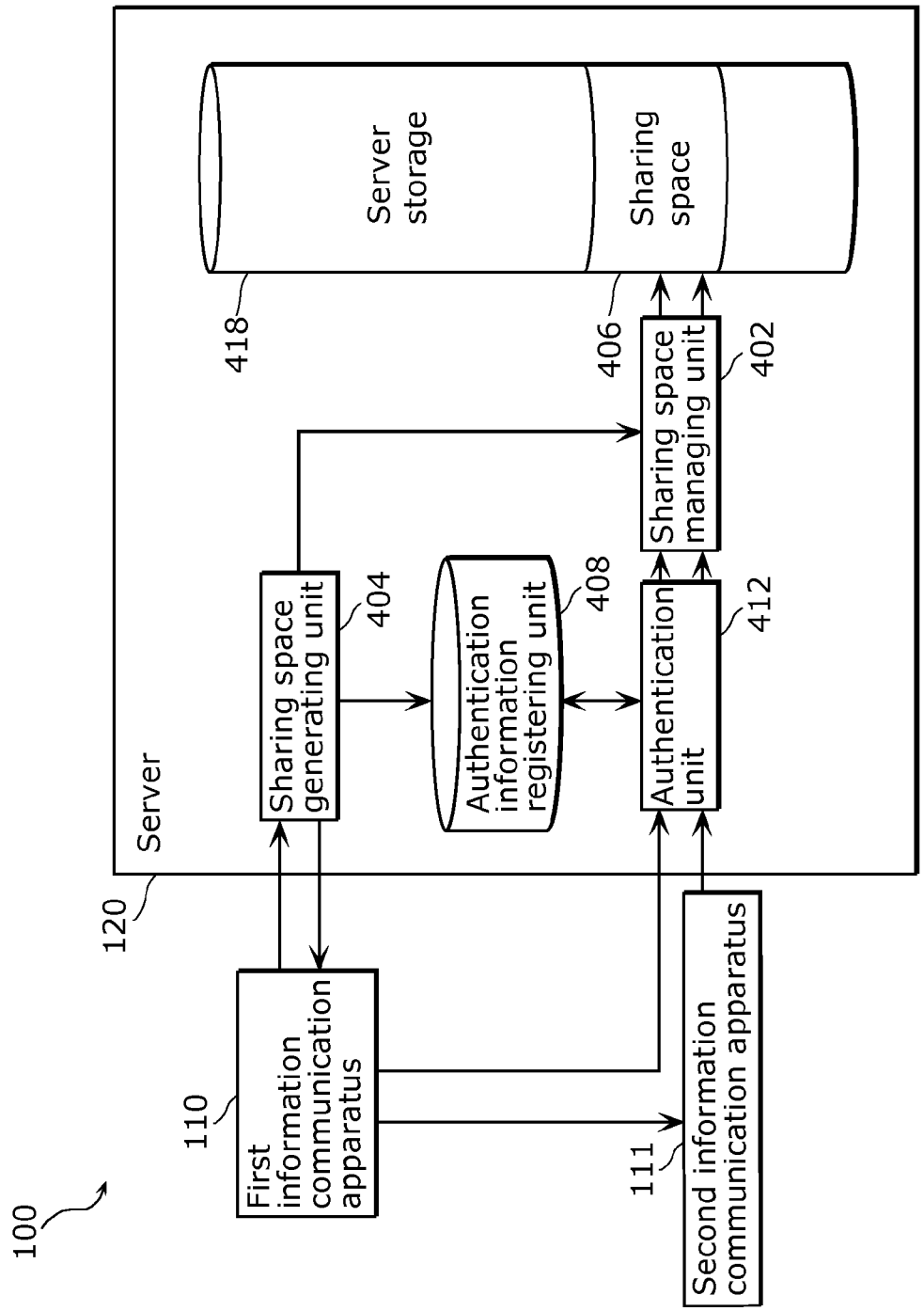

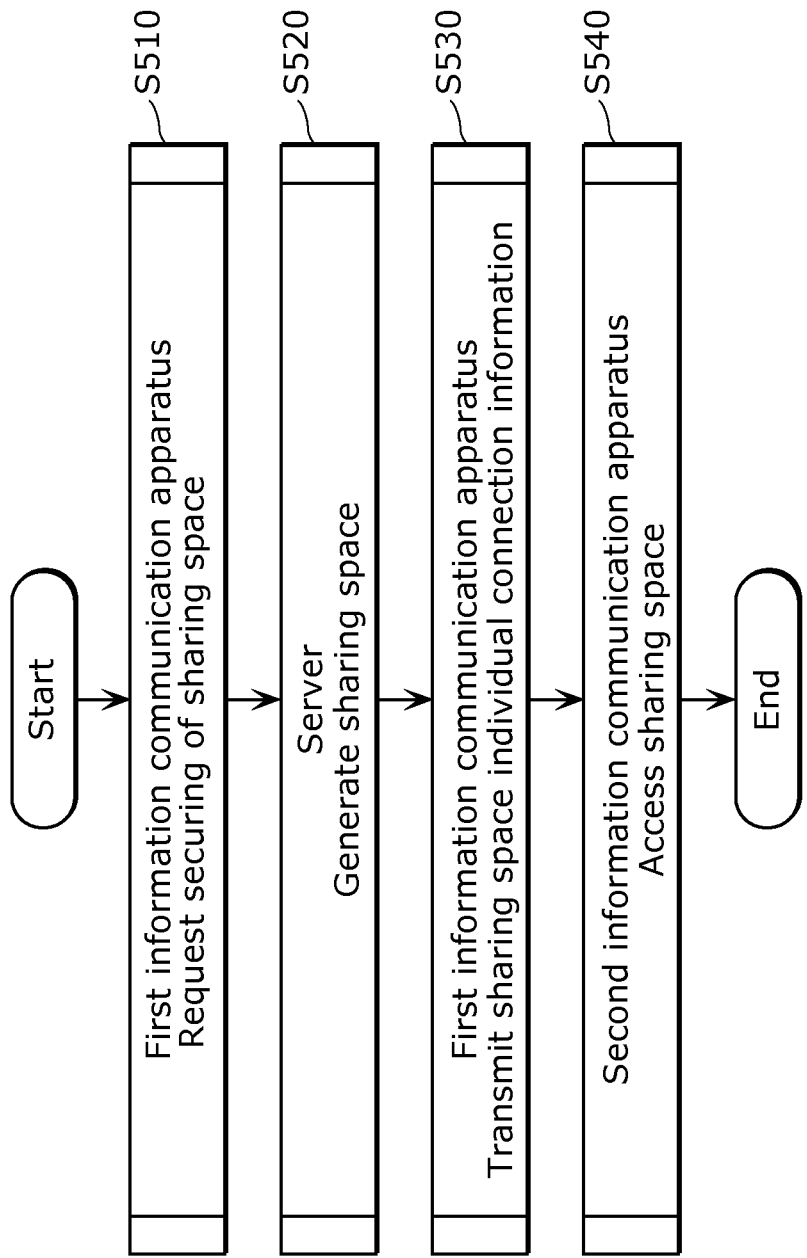

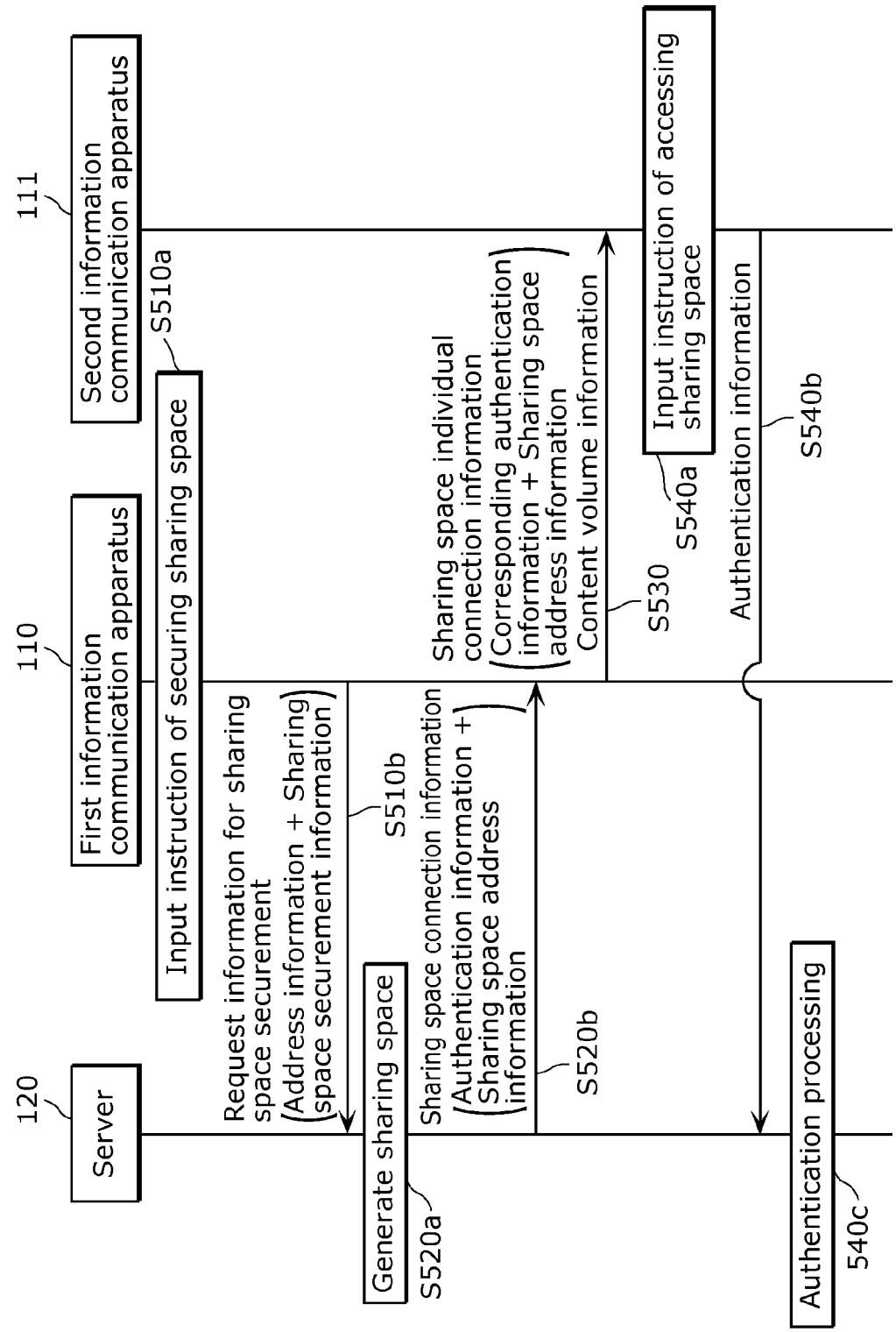

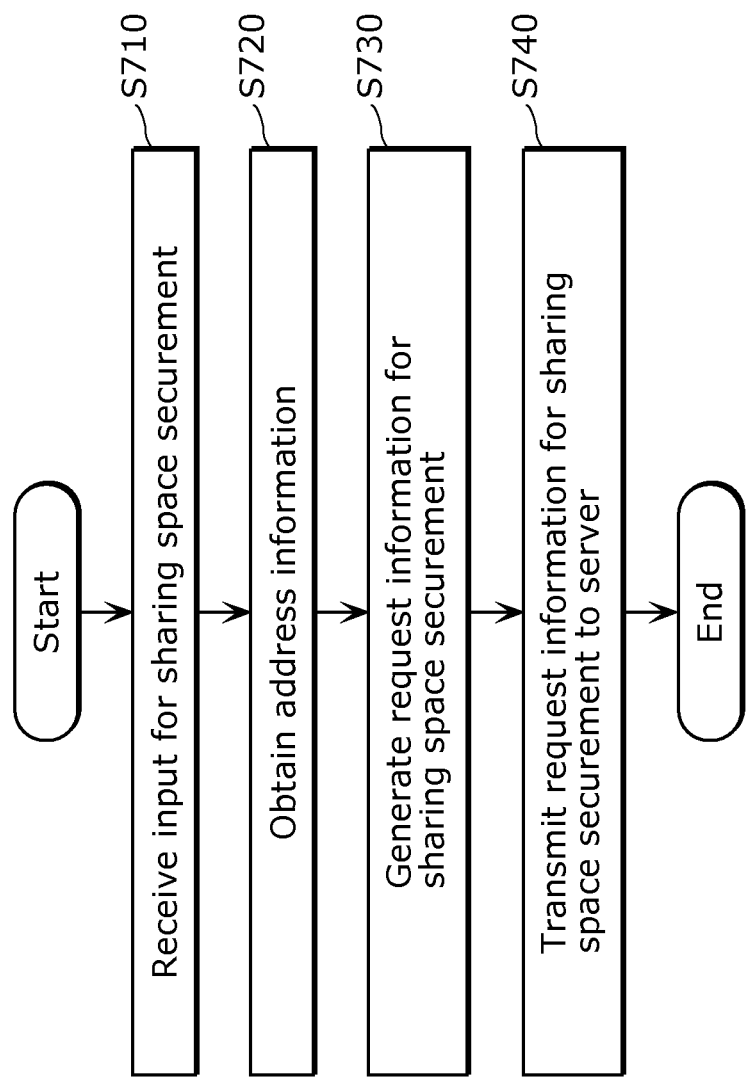

CONTENT SHARING SYSTEM, INFORMATION COMMUNICATION APPARATUS, CONTENT SHARING METHOD, AND COMMUNICATION METHOD

TECHNICAL FIELD

The present invention relates to a content sharing system and the like for sharing content with simplified user operation.

BACKGROUND ART

In recent years, with the popularization of mobile terminals such as digital cameras and smart phones, and the advancement of: social networking services (SNS) such as mixi (registered trademark), Facebook (registered trademark), and Flickr (registered trademark); and other content sharing services, users have more opportunities of easily capturing content such as pictures and videos, and of sharing them for fun.

CITATION LIST

Patent Literature

[PTL 1] Japanese Unexamined Patent Application Publication No. 2008-197746
[PTL 2] Japanese Unexamined Patent Application Publication No. 2011-138193

SUMMARY OF INVENTION

Technical Problem

The content sharing services described above are problematic in that content cannot be shared with a simplified user operation.

In view of the above, an object of the present invention is to provide a content sharing system and the like for sharing content with a simplified user operation.

Solution to Problem

In order to solve the above-described problem, a content sharing system according to an aspect of the present invention is a content sharing system including: a server; a first information communication apparatus; and one or more second information communication apparatuses, wherein content is shared using the first information communication apparatus and at least one of the second information communication apparatuses, in a sharing space which is a storage region on the server, at least between a first user who uses the first information communication apparatus and a second user who uses the second information communication apparatus, the first information communication apparatus includes: a sharing space securing unit configured to transmit address information and sharing space securement information to the server, and receive authentication information and sharing space address information from the server, the address information being associated with the second information communication apparatus, the sharing space securement information being for generating the sharing space on the server, the authentication information being for enabling the second user to access the sharing space using the second information communication apparatus, the sharing space address information representing an address of the sharing space generated based on the sharing space securement information; and a first communication unit configured to, after receiving the sharing space address information and the authentication information from the server, transmit the authentication information together with the sharing space address information to the second information communication apparatus corresponding to the authentication information, the server includes: a sharing space generating unit configured to generate the sharing space and the sharing space address information based on the sharing space securement information received from the first information communication apparatus, generate the authentication information, and transmit the sharing space address information and the authentication information to the first information communication apparatus; and an authentication unit configured to authenticate the authentication information received from the second information communication apparatus, and allow the second information communication apparatus to access the sharing space, the second information communication apparatus includes: a second communication unit configured to receive the sharing space address information and the authentication information from the first information communication apparatus; and a second storage into which the second communication unit stores the sharing space address information and the authentication information received by the second communication unit, and the second communication unit is configured to extract the authentication information from the second storage, and transmit the authentication information to the authentication unit of the server based on the sharing space address information stored in the second storage, to access the sharing space.

It is to be noted that these general and specific aspects may be implemented using a system, a method, an integrated circuit, a computer program, or a computer readable recording medium such as a CD-ROM, or any combination of systems, methods, integrated circuits, computer programs, or recording media.

Advantageous Effects of Invention

The content sharing system according to the present invention enables a user to share content with a simple operation.

BRIEF DESCRIPTION OF DRAWINGS

FIG. 2A is a diagram illustrating a configuration of a first information communication apparatus according to the exemplary embodiment.
FIG. 2B is a diagram illustrating an example of authentication information.
FIG. 3B is a diagram illustrating an example of the case where sharing space individual connection information is an e-mail.
FIG. 4 is a diagram illustrating a configuration of a server according to the exemplary embodiment.
FIG. 5 is a flow chart which shows an outline of an overall operation performed by the content sharing system.
FIG. 6 is a flow chart which shows the details of the overall operation performed by the content sharing system.
FIG. 7 is a flow chart of a sharing space securement requesting step.

Figure 1A:
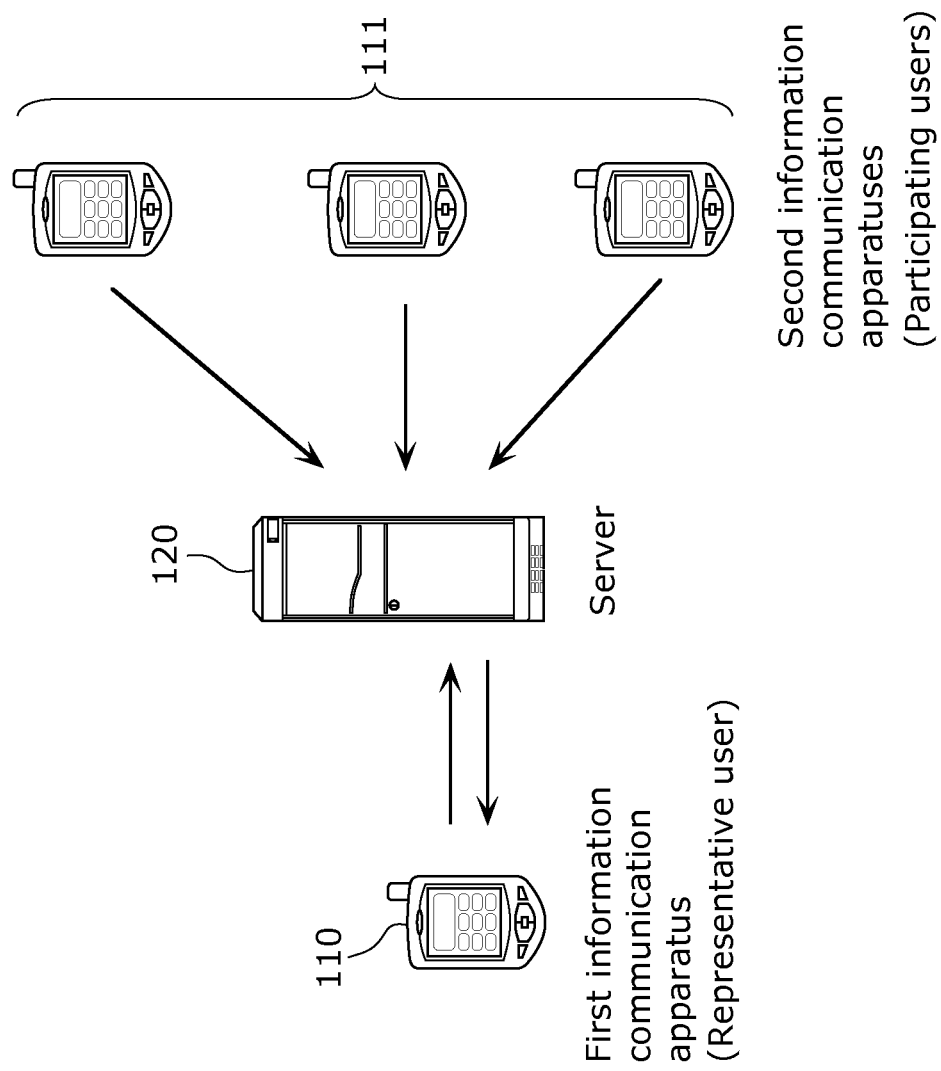
FIG. 1A is a diagram illustrating an outline of a content sharing system according to an exemplary embodiment.

DESCRIPTION OF EMBODIMENTS (Underlying Knowledge Forming Basis of the Present Invention)

As described in the Background Art, content sharing services have allowed users to have more opportunities of easily capturing content such as pictures and videos, and of sharing them for fun.

Conventionally, as a system for sharing content, there has been a system for sharing content among users (terminals) who have registered user information in advance on a server or a service (see Patent Literature (PTL) 1, for example).

In addition, there has been a system for sharing content among users who have exchanged necessary user information in advance (see Patent Literature (PTL) 2, for example).

With the above-described conventional systems, however, it is necessary for all of members who want to share content to perform complicated registration or the like for sharing content. In the case, for example, where a commemorative picture was taken and it is desired to share the picture on the spot among all of the members who were involved in the picture, it is problematic that complicated registration of user information or the like is required for sharing content to be viewed just on the spot.

In order to solve the above-described problem, a content sharing system according to an aspect of the present invention is a content sharing system including: a server; a first information communication apparatus; and one or more second information communication apparatuses, wherein content is shared using the first information communication apparatus and at least one of the second information communication apparatuses, in a sharing space which is a storage region on the server, at least between a first user who uses the first information communication apparatus and a second user who uses the second information communication apparatus, the first information communication apparatus includes: a sharing space securing unit configured to transmit address information and sharing space securement information to the server, and receive authentication information and sharing space address information from the server, the address information being associated with the second information communication apparatus, the sharing space securement information being for generating the sharing space on the server, the authentication information being for enabling the second user to access the sharing space using the second information communication apparatus, the sharing space address information representing an address of the sharing space generated based on the sharing space securement information; and a first communication unit configured to, after receiving the sharing space address information and the authentication information from the server, transmit the authentication information together with the sharing space address information to the second information communication apparatus corresponding to the authentication information, the server includes: a sharing space generating unit configured to generate the sharing space and the sharing space address information based on the sharing space securement information received from the first information communication apparatus, generate the authentication information, and transmit the sharing space address information and the authentication information to the first information communication apparatus; and an authentication unit configured to authenticate the authentication information received from the second information communication apparatus, and allow the second information communication apparatus to access the sharing space, the second information communication apparatus includes: a second communication unit configured to receive the sharing space address information and the authentication information from the first information communication apparatus; and a second storage into which the second communication unit stores the sharing space address information and the authentication information received by the second communication unit, and the second communication unit is configured to extract the authentication information from the second storage, and transmit the authentication information to the authentication unit of the server based on the sharing space address information stored in the second storage, to access the sharing space.

With this, the first information communication apparatus secures a sharing space on the server, obtains authentication information of all of the first and the second information communication apparatuses which share content therebetween, and transmits the authentication information to each of the information communication apparatuses, and thus it is possible for a user to share content with a simple operation.

In addition, the first communication unit may transmit, based on the address information, the authentication information together with the sharing space address information, to the second information communication apparatus corresponding to the authentication information.

In addition, the first information communication apparatus may further include a first input receiving unit configured to receive an input of at least the first user, the second information communication apparatus may further include a second input receiving unit configured to receive an input of at least the second user, the first communication unit may transmit the sharing space securement information including specified information received by the first input receiving unit and used for accessing the sharing space, and the second communication unit may transmit the authentication information including information received by the second input receiving unit and corresponding to the specified information.

As described above, by prespecifying specified information between the first user (hereinafter also referred to as a representative user) and the second user (hereinafter also referred to as a participating user), it is possible to prevent the second user from accessing a sharing space generated by the first user who is unknown by the second user.

In addition, the second information communication apparatus may further include a second content generating unit configured to generate content to be uploaded to the sharing space.

In addition, the first information communication apparatus may further include a first input receiving unit configured to receive an input of at least the first user, and in the first information communication apparatus, the sharing space securing unit may generate, based on the input received by the first input receiving unit, content volume information for specifying a volume of the content to be generated by the second content generating unit, the first communication unit may transmit the content volume information to the second information communication apparatus together with the sharing space address information and the authentication information, and in the second information communication apparatus, the second content generating unit may generate content of the volume specified by the content volume information.

In addition, in the server, the sharing space generating unit may generate, based on capacity of the generated sharing space, content volume information for specifying a volume of the content to be generated by the second content generating unit, and transmit the generated content volume information together with the sharing space address information and the authentication information, to the first information communication apparatus, and in the first information communication apparatus, the first communication unit may transmit the content volume information received from the server, to the second information communication apparatus together with the sharing space address information and the authentication information, and in the second information communication apparatus, the second content generating unit may generate content of the volume specified by the content volume information.

With this, the volume of content generated by the second information communication apparatus is specified by the first information communication apparatus or the server, and thus it is possible for a user of the second information communication apparatus to easily generate the content.

In addition, the second information communication apparatus may further include a second content generating unit configured to generate content to be uploaded to the sharing space, and when the second input receiving unit receives an input of an instruction on generation of content, the second content generating unit may generate content, and every time the second content generating unit generates content, the second communication unit may access the sharing space to upload the content generated by the second content generating unit to the sharing space.

With this, the second communication unit accesses the sharing space every time the second information communication apparatus generates content, and thus it is possible for a user of the second information communication apparatus to easily upload the content.

In addition, the sharing space securement information may include information for specifying capacity of the sharing space or information for specifying a term of validity of the sharing space, and the sharing space generating unit may generate the sharing space having the capacity or the term of validity which are specified by the sharing space securement information.

With this, it is possible for the representative user who uses the first information communication apparatus to specify the capacity and the term of validity of the sharing space.

In addition, the address information may be an e-mail address available to the second information communication apparatus.

With this, it is possible that the first and the second information communication apparatuses access the server using an e-mail address which a user generally uses and share content.

In addition, the first information communication apparatus may further include an address information storage in which the address information is stored, and the sharing space securing unit may select the address information stored in the address information storage and transmit the selected address information to the server.

With this, by selecting address information stored in advance, it is possible for the representative user to secure the sharing space with a simpler procedure.

In addition, the first information communication apparatus may further include a first storage into which the first communication unit stores the sharing space address information and the authentication information received by the first communication unit from the server, and the first communication unit may extract the authentication information from the first storage, and transmit the authentication information to the authentication unit of the server based on the sharing space address information stored in the first storage, to access the sharing space.

In addition, the first information communication apparatus may further include a first content generating unit configured to generate content, and when the first input receiving unit receives an input of an instruction on generation of content, the first content generating unit is configured to generate content, and every time the first content generating unit generates content, the first communication unit may access the sharing space to upload the content generated by the first content generating unit to the sharing space.

In addition, an information communication apparatus according to an aspect of the present invention is an information communication apparatus for sharing content, using one or more second information communication apparatuses in a sharing space which is a storage region on a server, with at least a second user who uses one of the second information communication apparatuses, the information communication apparatus including: a sharing space securing unit configured to transmit address information and sharing space securement information to the server, and receive authentication information and sharing space address information from the server, the address information being associated with the second information communication apparatus, the sharing space securement information being for generating the sharing space on the server, the authentication information being for enabling the second user to access the sharing space using the second information communication apparatus, the sharing space address information representing an address of the sharing space generated based on the sharing space securement information; and a first communication unit configured to, after receiving the sharing space address information and the authentication information from the server, transmit the authentication information together with the sharing space address information to the second information communication apparatus corresponding to the authentication information.

In addition, a communication method according to an aspect of the present invention is a communication method for sharing content, using one or more second information communication apparatuses in a sharing space which is a storage region on a server, with at least a second user who uses one of the second information communication apparatuses, the communication method including: transmitting address information and sharing space securement information to the server, and receiving authentication information and sharing space address information from the server, the address information being associated with the second information communication apparatus, the sharing space securement information being for generating the sharing space on the server, the authentication information being for enabling the second user to access the sharing space using the second information communication apparatus, the sharing space address information representing an address of the sharing space generated based on the sharing space securement information; and transmitting, after receiving the sharing space address information and the authentication information from the server, the authentication information together with the sharing space address information to the second information communication apparatus corresponding to the authentication information.

In addition, the present invention may be implemented as a program for causing an information communication apparatus to execute the communication method described above.

In addition, a content sharing method according to an aspect of the present invention is a content sharing method for sharing content, using a first information communication apparatus and one or more second information communication apparatuses, in a sharing space which is a storage region on a server, at least between a first user who uses the first information communication apparatus and a second user who uses a corresponding one of the second information communication apparatuses, the content sharing method including: transmitting address information and sharing space securement information to the server, and receiving authentication information and sharing space address information from the server, the transmitting and the receiving being performed by the first information communication apparatus, the address information being associated with the second information communication apparatus, the sharing space securement information being for generating the sharing space on the server, the authentication information being for enabling the second user to access the sharing space using the second information communication apparatus, the sharing space address information representing an address of the sharing space generated based on the sharing space securement information; after the sharing space address information and the authentication information are received from the server, transmitting the authentication information together with the sharing space address information to the second information communication apparatus corresponding to the authentication information, the transmitting of the authentication information being performed by the first information communication apparatus; generating the sharing space and the sharing space address information based on the sharing space securement information received from the first information communication apparatus, generating the authentication information, and transmitting the sharing space address information and the authentication information to the first information communication apparatus, the generating and transmitting being performed by the server; authenticating the authentication information received from the second information communication apparatus, and allowing the second information communication apparatus to access the sharing space, the authenticating and allowing being performed by the server; receiving the sharing space address information and the authentication information from the first information communication apparatus, and storing the received sharing space address information and the authentication information into a second storage, the receiving and storing being performed by the second information communication apparatus; and extracting the authentication information and the sharing space address information from the second storage, and accessing the sharing space based on the authentication information and the sharing space address information, the extracting and accessing being performed by the second information communication apparatus.

It is to be noted that these general and specific aspects may be implemented using a system, a method, an integrated circuit, a computer program, or a computer readable recording medium such as a CD-ROM, or any combination of systems, methods, integrated circuits, computer programs, or recording media.

The following describes an exemplary embodiment with reference to the drawings.

It is to be noted that the exemplary embodiment described below indicates a general or specific example. The numerical values, shapes, materials, structural elements, the arrangement and connection of the structural elements, steps, the processing order of the steps etc. shown in the following embodiment are mere examples, and therefore do not limit the scope of the Claims. In addition, among the structural elements in the following embodiment, structural elements not recited in any one of the independent claims are described as arbitrary structural elements.

Embodiment

Outline of a Content Sharing System

First, a content sharing system according to the exemplary embodiment will be described.

FIG. 1A is a diagram illustrating an outline of a content sharing system 100 according to the exemplary embodiment. The content sharing system 100 includes: a first information communication apparatus 110; a plurality of second information communication apparatuses 111; and a server 120.

Here, the first information communication apparatus 110 is used by a representative among users who share content (hereinafter referred to as a representative user or a first user).

In addition, the second information communication apparatuses 111 are used by users other than the representative user among the users who share content (hereinafter referred to as participating users or second users). It is to be noted that it is sufficient that at least one participating user and at least one second information communication apparatus 111 are present; however, it is assumed in the exemplary embodiment described below that there are a plurality of the participating users and a plurality of the second information communication apparatuses 111.

In the content sharing system 100 according to the exemplary embodiment, the representative user accesses the server 120 using the first information communication apparatus 110, thereby securing a sharing space for sharing content on the server 120. The representative user, at the same time, receives authentication information of each of the participating users (an information item, which will be described later, for a participating user to access the server 120 using the second information communication apparatus 111) from the server 120 and transmits the authentication information to each of the participating users.

This allows the participating users to obtain the authentication information and to access the sharing space on the server 120 in advance without executing procedures with the server 120 using the second information communication apparatus 111. This means that the participating users can easily share content in the sharing space without a complicated operation.

In addition, the representative user has conventionally used a plurality of functions of the information communication apparatus to access the server 120, however, the first information communication apparatus 110 allows the representative user to access the server 120 with a simplified operation. In addition, the simplified operation allows the representative user to notify the participating users of information for connecting to the sharing space.

The first information communication apparatus 110 and the second information communication apparatuses 111 are described as smartphones according to the exemplary embodiment. However, the first information communication apparatus 110 and the second information communication apparatuses 111 are not limited to smartphones. For example, the first and the second information communication apparatuses may be digital cameras or tablet terminals.

In addition, the server 120 manages information of a user who accesses a sharing space on the server 120. The server 120 is a computer system including a general purpose computer.

Furthermore, the sharing space is a storage region that is secured on the storage apparatus which is managed by the server 120.

Figure 1B:
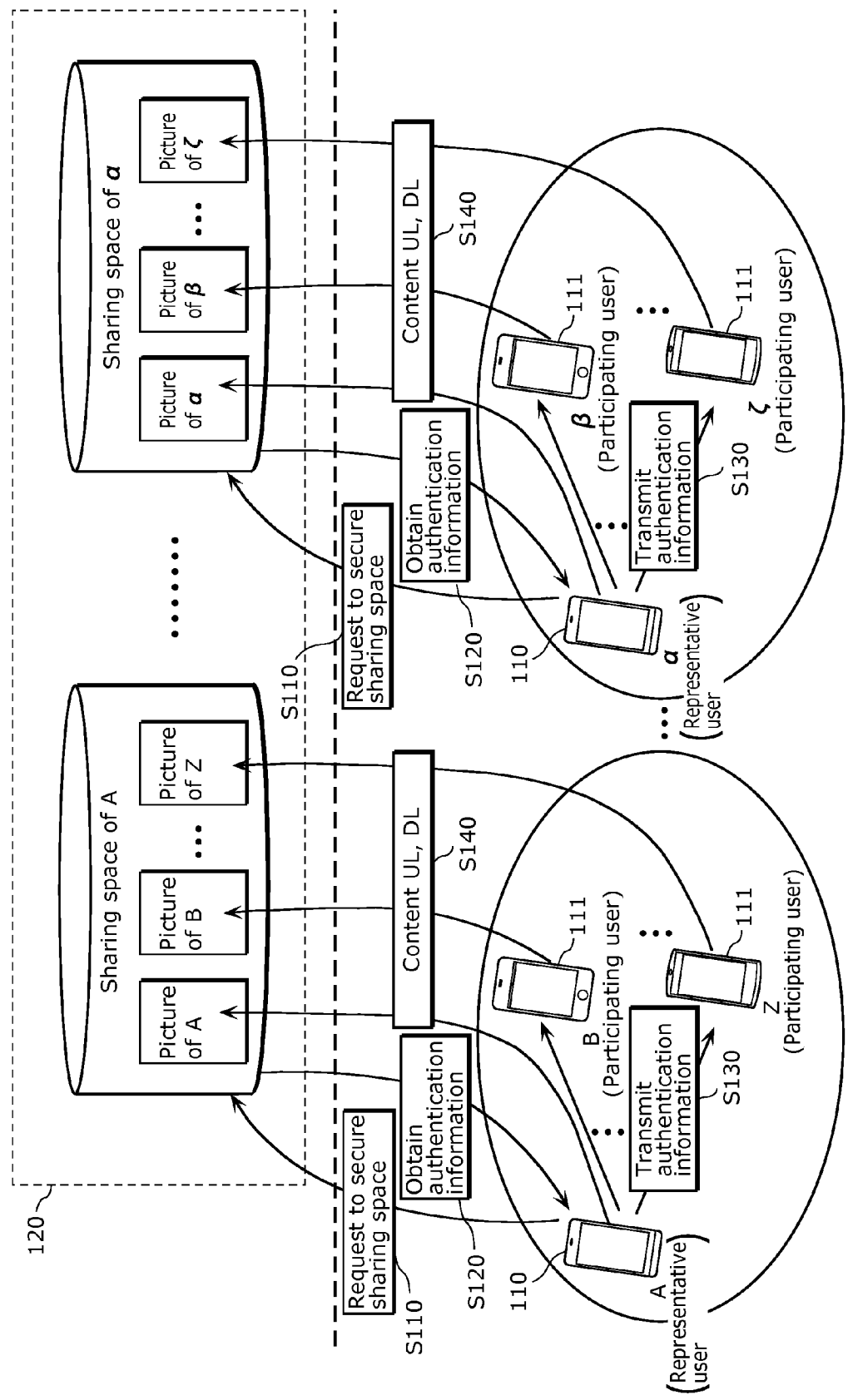
FIG. 1B is a summarized diagram illustrating an operation of the content sharing system.

FIG. 1B is a diagram illustrating the outline of operations performed by the content sharing system 100.

First, the representative user sends a request to secure a sharing space to the server 120 using the first information communication apparatus 110 (S110), and obtains authentication information of all users (participating users and the representative user) who share content in the secured sharing space (S120).

The authentication information is transmitted to the second information communication apparatus 111 of each of the participating users (S130), the representative user and each of the participating users access the sharing space on the server 120 using the authentication information, and uploads (UL) or downloads (DL) content (a picture, for example) (S140).

As illustrated in FIG. 1B, sharing spaces of a plurality of representative users are generated on the server 120, and the each of the sharing spaces are shared by the representative user who requested to secure the sharing space and the participating users who are specified by the representative user.

[Configuration of the First Information Communication Apparatus]

Next, the configuration of the first information communication apparatus 110 will be described.

FIG. 2A is a diagram illustrating a configuration of the first information communication apparatus 110.

The first information communication apparatus 110 includes: a first input receiving unit 202; an address information storage 204; a first storage 206; a sharing space securing unit 208; a first content generating unit 220; and a first communication unit 222.

The first input receiving unit 202 receives an input from the representative user who uses the first information communication apparatus 110, and transmits information to the sharing space securing unit 208 and the first content generating unit 220 based on the details of the input. The first input receiving unit 202 is, for example, a button provided on the first information communication apparatus 110, a touch panel overlaid with a display screen included in the first information communication apparatus 110, or the like.

The sharing space securing unit 208 generates request information for sharing space securement for securing a sharing space based on the input from the representative user which has been received by the first input receiving unit 202, and transmits the generated request information for sharing space securement to the server 120 via the first communication unit 222. In addition, the sharing space securing unit 208 receives sharing space connection information for accessing the sharing space secured on the server 120, from the server 120 via the first communication unit 222.

The request information for sharing space securement is information that includes sharing space securement information and address information. In addition, the sharing space connection information is information that includes the authentication information and sharing space address information.

The sharing space securement information is information for securing a sharing space on the server 120, and the server 120 generates a sharing space on the server 120 when the sharing space securement information is received.

It is to be noted that, according to the exemplary embodiment, the sharing space securement information includes information that specifies a capacity (storage capacity) of the sharing space, or information that specifies a term of validity of the sharing space. Accordingly, the server 120 generates a sharing space which has a specified capacity or a specified term of validity. It is to be noted that the capacity or the term of validity of the sharing space may not be included in the sharing space securement information. In this case, the server 120 generates a sharing space with a predetermined capacity and a term of validity which have been determined in advance on the server 120.

The address information is information associated to each of the first and the second information communication apparatuses. The address information is described as an e-mail address usable in the first and the second information communication apparatus, according to the exemplary embodiment. However, when the first and the second information communication apparatuses 111 are mobile terminals such as the smartphones, the address information may be an address (telephone number) of short message service (SMS). In addition, the address information may be account information of SNS of a user who uses the first or the second information communication apparatuses, but the address information is not limited to those information items described above. In sum, the information associated to each of the first and the second information communication apparatuses includes information associated to a user who uses the first and the second information communication apparatuses.

The sharing space address information is information representing an address of a sharing space which is used by the first information communication apparatus 110 and the second information communication apparatus 111 for accessing the sharing space. In the exemplary embodiment, the sharing space address information is described as URL information of the sharing space, for example.

It is to be noted that when the first information communication apparatus 110 has already secured an available sharing space and obtained the sharing space address information of the sharing space, the first information communication apparatus 100 need not necessarily receive the sharing space address information.

An example of such a case is, for example, the case where the first information communication apparatus 110 accessed the server 120 and used a sharing space in the past, and valid sharing space address information of the sharing space that was used is already stored in the first storage 206. In this case, the sharing space securing unit 208 transmits the authentication information together with the sharing space address information read from the first storage 206 to a corresponding one of the second information communication apparatuses 111 via the first communication unit 222.

The authentication information is information which is used by the first information communication apparatus 110 and the second information communication apparatus 111 for accessing the sharing space.

FIG. 2B is a diagram illustrating an example of the authentication information.

A shown in FIG. 2B, the authentication information is information associated with the address information. More specifically, the authentication information is information which is associated respectively with the first information communication apparatus 110 and the second information communication apparatus 111. As illustrated in FIG. 2B, the authentication information according to the exemplary embodiment is described as an account and a password assigned to each of the first and the second information communication apparatuses. However, the authentication information may be session information or token information which are typically used by general WEB applications, and the authentication information is not limited to these examples stated above.

It is to be noted that, when the first information communication apparatus 110 has already obtained the authentication information corresponding to the first information communication apparatus itself, the first information communication apparatus 110 receives only the authentication information associated to each of the second information communication apparatuses 111. An example of such a case is, for example, the case where the first information communication apparatus 110 accessed the server 120 in the past, and valid authentication information is already stored in the first storage 206.

In addition, the sharing space securing unit 208 transmits sharing space individual connection information to the second information communication apparatuses 111 via the first communication unit 222. The sharing space individual connection information is information including the above-described sharing space address information and the authentication information corresponding to the respective second information communication apparatuses 111. The transmission of the sharing space individual connection information is performed on each of the second information communication apparatuses based on the address information.

The first content generating unit 220 generates content based on the input received by the first input receiving unit 202. According to the exemplary embodiment, the first content generating unit 220 is described as a unit including a capturing unit 212. The first content generating unit 220 captures content such as pictures and video as content, by the capturing unit 212. The capturing unit 212 is, for example, a complementary metal oxide semiconductor (CMOS) camera, a charge coupled device (CCD) camera, and the like.

The first communication unit 222 transmits, to each of the second information communication apparatuses 111, the sharing space individual connection information received from the sharing space securing unit 208.

In addition, the content generated by the first content generating unit 220 is uploaded to the sharing space via the first communication unit 222. Further, the content downloaded from the sharing space is stored in the first storage 206 via the first communication unit 222. In this case, for example, the first information communication apparatus 110 may include a non-illustrated uploading unit and the uploading of content via the first communication unit 222 may be performed according to an instruction of the uploading unit. In the same manner as above, the first information communication apparatus 110 may include a non-illustrated downloading unit and the downloading of content via the first communication unit 222 may be performed according to an instruction of the downloading unit.

The address information storage 204 stores the address information associated with the respective second information communication apparatuses 111. To be specific, e-mail addresses are stored in the address information storage 204. The specific configuration of the address information storage 204 is not specifically limited, and is, for example, a medium capable of storing data, such as a dynamic random access memory (DRAM), a synchronous dynamic random access memory (SDRAM), a flash memory, a ferroelectric memory, a hard disk drive (HDD), and so on.

The sharing space connection information is stored in the first storage 206. In addition, the content generated by the first content generating unit 220 and the content download from the sharing space are stored in the first storage 206. The specific configuration of the first storage 206 is not specifically limited. It is sufficient that the first storage 206 is a medium capable of storing data as with the address information storage 204.

The configuration of the first information communication apparatus 110 according to the exemplary embodiment has been described above.

The first information communication apparatus 110 accesses the server 120 to secure a sharing space for sharing content on the server 120.

In addition, the first information communication apparatus 110 receives, from the server 120, the sharing space address information representing the address of the secured sharing space and the authentication information for enabling the second information communication apparatuses 111 to accesses the server 120, and transmits the sharing space address information and the authentication information to the respective second information communication apparatuses 111.

This allows each of the second information communication apparatuses 111 to acquire authentication information of its own without accessing the server 120 in advance, and to easily access the sharing space on the server 120 without complicated operations.

[Configuration of the Second Information Communication Apparatus]

Next, the configuration of the second information communication apparatus 111 will be described.

Figure 3A:
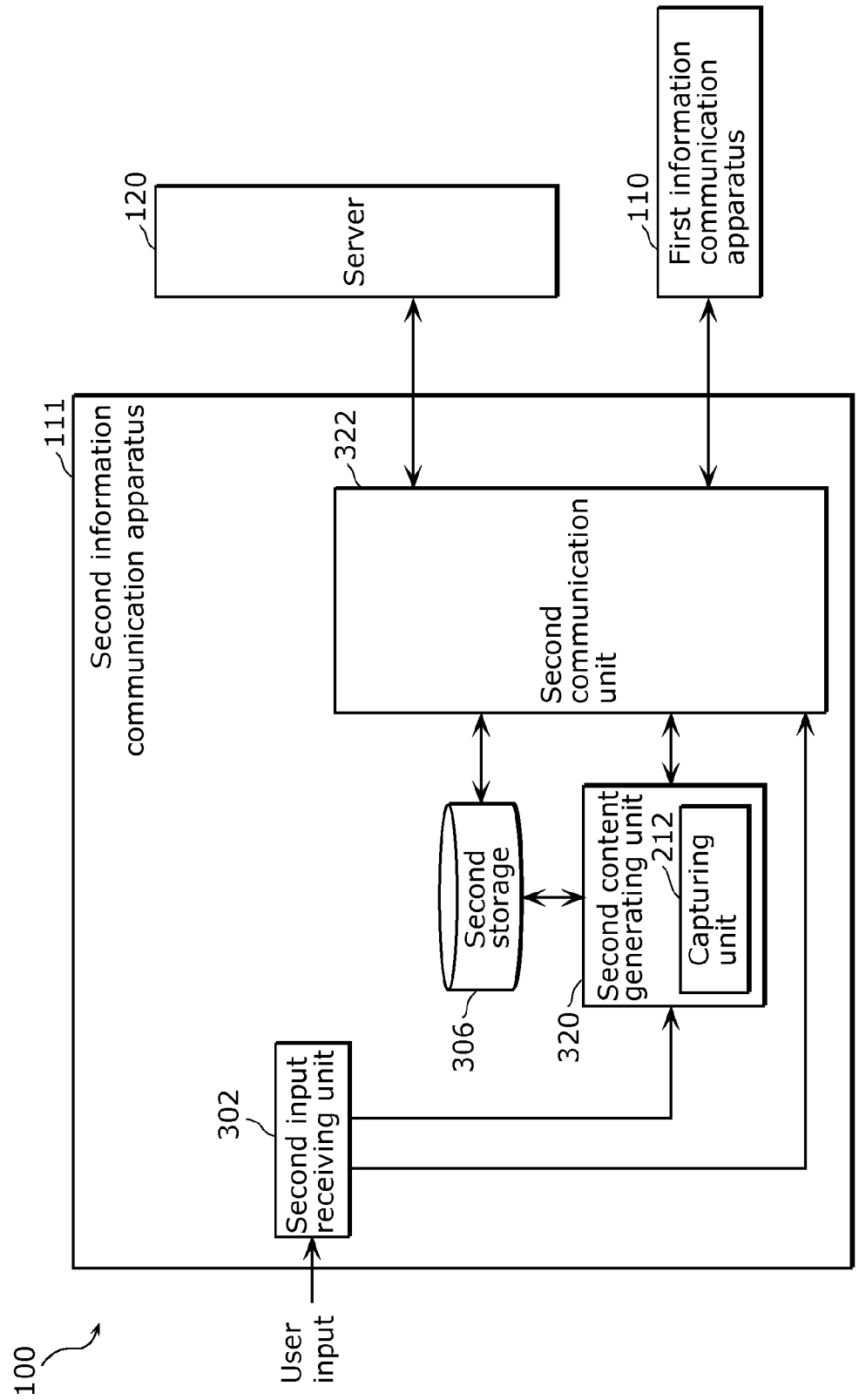
FIG. 3A is a diagram illustrating a configuration of a second information communication apparatus according to the exemplary embodiment.

FIG. 3A is a diagram illustrating a configuration of the second information communication apparatus 111.

The second information communication apparatus 111 includes: a second input receiving unit 302; a second storage 306; a second content generating unit 320; and a second communication unit 322.

The second input receiving unit 302 receives an input from the participating user who uses the second information communication apparatus 111, and transmits information to the second content generating unit 320 based on the details of the input.

The second input receiving unit 302 is, for example, a button provided on the second information communication apparatus 111, a touch panel overlaid with a display screen included in the second information communication apparatus 111, as with the first input receiving unit 202.

The second content generating unit 320 generates content based on the input received by the second input receiving unit 302. In the same manner as the first content generating unit 220, the second content generating unit 220 includes the capturing unit 212 and captures content such as pictures and video as content.

The second communication unit 322 receives sharing space individual connection information from the first information communication apparatus 110. The sharing space individual connection information received by the second communication unit 322 is described as being transmitted and received by e-mail, according to the exemplary embodiment.

FIG. 3B is a diagram illustrating an example of the case where the sharing space individual connection information is transmitted and received by e-mail.

In this case, the sharing space address information is the string of letters subsequent to "URL:" in the body of the e-mail. Further, the authentication information is the string of letters subsequent to "Account:" and the string of letters subsequent to "Password:" in the body of the e-mail. It is to be noted that the received e-mail is stored in the second storage 306.

In addition, the second communication unit 322, when the second input receiving unit 302 receives an input of accessing the sharing space, extracts the sharing space address information from the second storage 306 and accesses the server 120. More specifically, for example, among the e-mails stored in the second storage 306, an e-mail in which Subject of the e-mail is "Content sharing" is searched for, the string of letters subsequent to "URL:" in the body of the e-mail is searched for and extracted, to access the sharing space. Next, the string of letters subsequent to each of "Account" and "Password" in the body of the e-mail is searched for and extracted, and the authentication process is performed in the server 120. In sum, the second communication unit 322 extracts the authentication information from the second storage 306 and transmits the authentication information to the server 120 to access the sharing space.

It is to be noted that transmitting and receiving means for the sharing space individual connection information is not limited to e-mails. General message services may be used, such as SMS or message services provided by SNS.

In addition, the second communication unit 322 uploads, to the sharing space, the content generated by the second content generating unit 320. Further, the second communication unit 322 stores, in the second storage 306, the content downloaded from the sharing space.

It is to be noted that, although it has been described in the above description that the second communication unit 322 extracts the sharing space address information to access the server 120 or to upload or download content, the second communication unit 322 may communicate only with the first information communication apparatus 110 or the server 120. In this case, the second information communication apparatus 111 may include a non-illustrated uploading unit and the access to the server 120 and the uploading of content via the second communication unit 322 may be performed according to an instruction of the uploading unit. In the same manner as above, the second information communication apparatus 111 may include a non-illustrated downloading unit and the access to the server 120 and the downloading of content via the second communication unit 322 may be performed according to an instruction of the downloading unit.

The sharing space address information and the authentication information which are received from the first information communication apparatus 110 by the second communication unit 322 are stored in the second storage 306. In addition, the content generated by the second content generating unit 320 and the content downloaded from the sharing space by the second communication unit 322 are stored in the second storage 306. The specific configuration of the second storage 306 is not specifically limited. It is sufficient that the second storage 306 is a medium capable of storing data as with the first storage 206.

The configuration of the second information communication apparatus 111 according to the exemplary embodiment has been described above.

The second information communication apparatus 111 accesses the sharing space based on an input by a participating user who uses the second information communication apparatus 111. At this time, the participating user can easily access the sharing space without separately inputting the sharing space address information which is the URL of the sharing space, or the authentication information such as the account or the password.

[Configuration of the Server]

Next, the configuration of the server 120 will be described.

FIG. 4 is a diagram illustrating a configuration of the server 120.

The server 120 includes: a sharing space generating unit 404; an authentication information registering unit 408; an authentication unit 412; a server storage 418; and a sharing space managing unit 402.

The sharing space generating unit 404 receives request information for sharing space securement from the first information communication apparatus 110. The sharing space generating unit 404 generates a sharing space 406 in the server storage 418 using the sharing space managing unit 402 based on the sharing space securement information included in the request information for sharing space securement which has been received. In addition, the sharing space generating unit 404 receives the sharing space address information which is generated by the sharing space managing unit 402 and which represents the address of the sharing space.

Next, the sharing space generating unit 404 generates authentication information corresponding one-to-one to the address information, based on the address information included in the request information for sharing space securement which has been received. In addition, the sharing space generating unit 404 transmits sharing space connection information including the sharing space address information and the authentication information, to the first information communication apparatus 110.

The sharing space managing unit 402 is interposed between: the sharing space 406; and the sharing space generating unit 404 and the authentication unit 412, and performs the processing of managing the sharing space such as input and output of content to and from the sharing space (generation of the sharing space, upload and download of content to and from the sharing space, and so on).

The authentication information registering unit 408 registers the authentication information generated by the sharing space generating unit 404.

The authentication unit 412 authenticates the authentication information received from the first and the second information communication apparatuses by checking the received authentication information against the authentication information registered on the authentication information registering unit 408, and allows the first and the second information communication apparatuses to access the sharing space 406.

The server storage 418 is a storage (storage region) included in the server 120, and the sharing space is generated in the server storage 418. The content uploaded from the first and the second information communication apparatuses is stored in the sharing space 406. The server storage 418 is a storage such as a hard disk drive, for example. It is to be noted that, although the server storage 418 is built into the server 120 according to the exemplary embodiment, the server storage 418 may be a storage connected to the server 120 by an interface such as a universal serial bus (USB). In addition, the server storage 418 may be a storage connected the server 120 via a network.

It is to be noted that, although the server 120 is described as a server including the sharing space managing unit 402 according to the exemplary embodiment, the server 120 may be configured without the sharing space managing unit 402. In this case, the function of the sharing space managing unit 402 is provided to the sharing space generating unit 404, thereby enabling omission of the sharing space managing unit 402.

For example, the sharing space generating unit 404 may generate the sharing space 406 directly in the server storage 418 based on the sharing space securement information included in the request information for sharing space securement which has been received. In addition, the sharing space generating unit 404 may manage uploading and downloading of content to and from the sharing space performed by the first information communication apparatus 110 and the second information communication apparatus 111.

[Overall Operation of the Content Sharing System]

Next, an overall operation of the sharing space in the content sharing system 100 will be described.

FIG. 5 and FIG. 6 are flow charts which illustrate the overall operation of the content sharing system 100.

In the content sharing system 100, the first information communication apparatus 110 first sends a request to secure a sharing space to the server 120 (S510 in FIG. 5).

More specifically, as illustrated in FIG. 6, the first information communication apparatus 110 receives an input from a representative user (S510*a* in FIG. 6), and transmits (i) address information associated one-to-one with the second information communication apparatuses and (ii) sharing space securement information for generating the sharing space, to the server 120 (S510*b* in FIG. 6).

Next, the server 120 generates the sharing space 406 (S520 in FIG. 5).

More specifically, the server 120 generates the sharing space 406 based on the sharing space securement information received from the first information communication apparatus 110 (S520*a* in FIG. 6), and transmits the sharing space connection information (sharing space address information+authentication information) for accessing the sharing space 406, to the first information communication apparatus 110 (S520*b* in FIG. 6).

Next, the first information communication apparatus 110 transmits sharing space individual connection information to the second information communication apparatuses 111 (S530 in FIG. 5)

More specifically, the first information communication apparatus 110 transmits, to each of the second information communication apparatuses 111, the sharing space individual connection information which includes only the corresponding authentication information based on the address information (S530 in FIG. 6).

Lastly, the second information communication apparatuses 111 access the sharing space 406 on the server 120 (S540 in FIG. 5).

More specifically, when an input for accessing the sharing space 406 is received from the participating user (S540*a* in FIG. 6), the second information communication apparatuses 111 extracts the sharing space address information and the authentication information from the sharing space individual connection information, and transmits the extracted information to the server 120 (S540*b* in FIG. 6).

Next, the server 120 performs authentication processing (S540*c* in FIG. 6) to allow the second information communication apparatuses 111 to access the sharing space 406.

The following describes in detail each of the Steps S510 to S540 illustrated in FIG. 5.

[Sharing Space Securement Requesting Step]

First, a sharing space securement requesting step (Step S510 in FIG. 5) will be described in detail.

FIG. 7 is a flow chart of the sharing space securement requesting step. The sharing space securement requesting step is an operation performed mainly by the first information communication apparatus 110.

First, the sharing space securing unit 208, in response to an input of sharing space securement request (S710), obtains address information corresponding one-to-one to the second information communication apparatuses (S720). Here, the input for sharing space securement may include an input for selecting a participating user with whom content are to be shared. For the input for selecting a participating user, when the first information communication apparatus 110 includes a display unit (not illustrated), for example, a list of users corresponding to the address information stored in the address information storage 204 may be displayed on the display unit, to receive an input for the selecting from the representative user. Then, the address information corresponding to the selected participating user may be obtained.

The method of obtaining the address information is not specifically limited. According to the exemplary embodiment, the sharing space securing unit 208 obtains an e-mail address of the second information communication apparatus 111 (participating user) from the address information storage 204.

At this time, the first information communication apparatus 110, for example, may start up an integrated application which is dedicated to the content sharing system 100 and which is capable of collectively performing setting for sharing of content such as a picture, generation of content, editing of content, and so on. In this case, the integrated application includes a menu for selecting a participating user, and address information is selected from the address information storage 204 based on an input from the menu. In addition, an application for editing content such as a picture, which is generated by the first content generating unit 220, may include a menu for selecting a participating user.

Next, the sharing space securing unit 208 generates request information for sharing space securement which includes the address information (S730). Here, the request information for sharing space includes: the address information of a participating user; and a capacity and a term of validity of the sharing space 406 as the sharing space securement information, as described above. In this case, for example, the above-described integrated application may further receive an input of the capacity and the term of validity of the sharing space 406 to be generated. In addition, the capacity or the term of validity of the sharing space 406 may not be included in the sharing space securement information. In this case, the server 120 generates the sharing space 406 with a predetermined capacity and a term of validity which have been determined in advance on the server 120.

Next, the sharing space securing unit 208 transmits the request information for sharing space securement to the server 120 via the first communication unit 222 (S740).

It is to be noted that the processing order of Step S710 to Step S740 is an example, and the order need not necessarily be the same as the order described above. Further, a plurality of steps may be executed in parallel.

As described above, in the sharing space securement requesting step, the representative user can perform request processing for newly securing the sharing space 406 to the server 120, just by selecting a participating user.

It is to be noted that, according to the exemplary embodiment, the address information is an e-mail address, and it is possible to easily secure the sharing space 406 among users whose address information is stored in their respective first information communication apparatus 110 and second information communication apparatuses 111. However, the address information need not necessarily be stored in advance. For example, the representative user may input the address information directly to the first input receiving unit 202 in the above-described Step S710.

[Sharing Space Generating Step]

Next, a sharing space generating step (Step S520 in FIG. 5) will be described in detail.

Figure 8:
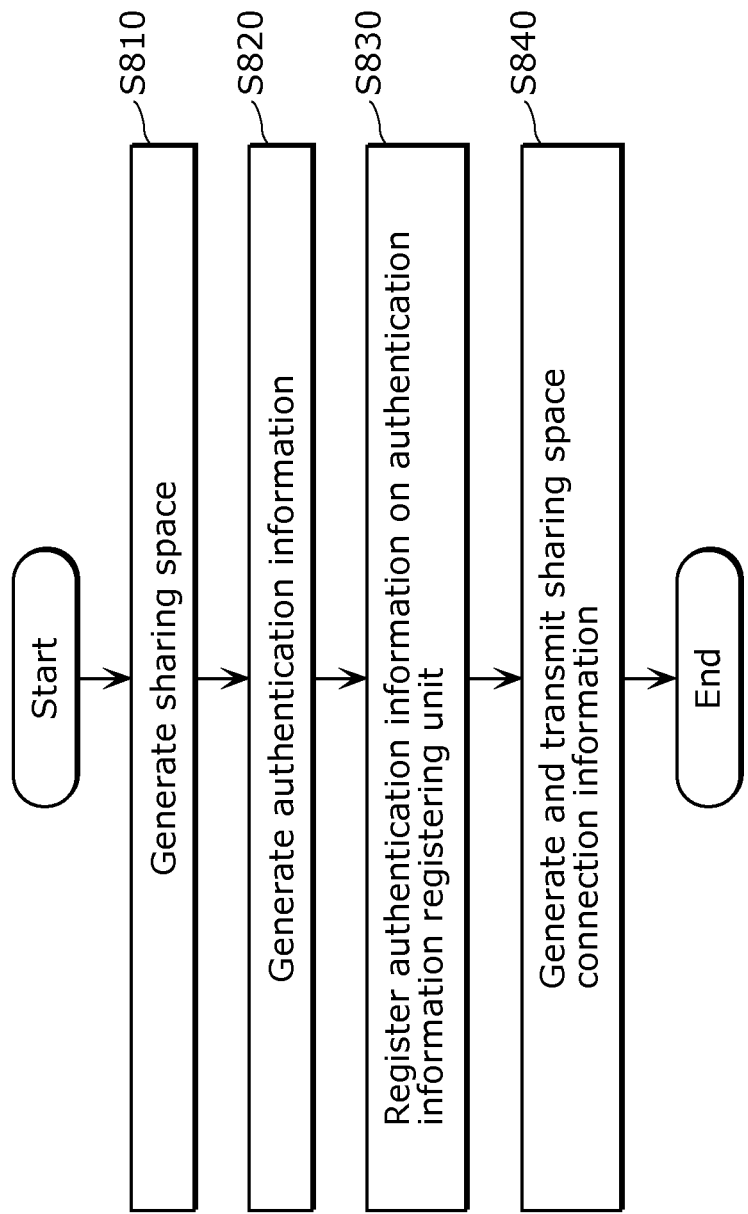
FIG. 8 is a flow chart of a sharing space generating step.

FIG. 8 is a flow chart of a sharing space generating step. The sharing space generating step is mainly performed by the server 120.

The sharing space generating step starts in response to the reception, by the sharing space generating unit 404, of the request information for sharing space securement which is transmitted to the server 120 from the first information communication apparatus 110.

First, the sharing space generating unit 404, upon receiving the request information for sharing space securement from the first information communication apparatus 110, generates the sharing space 406 in the server storage 418 using the sharing space managing unit 402, based on the details of the request information for sharing space securement (the capacity and the term of validity of the sharing space) (Step S810). In addition, the sharing space generating unit 404, in parallel with the generation of the sharing space 406, generates sharing space address information which represents the address of the sharing space 406.

It is to be noted that the sharing space 406 is generated so as not to overlap with the sharing space that has already been generated in the server 120. In addition, the capacity of the sharing space 406 to be generated may be a predetermined value that has been specified in advance. For example, a predetermined percentage (1%, for example) of the capacity may be allocated to the sharing space 406 out of the capacity in the server storage 418 which can be allocated to the sharing space 406 at the time when the sharing space generating unit 404 receives the request information for sharing space securement.

In addition, when the capacity is specified by the request information for sharing space securement as in the exemplary embodiment, a specified capacity out of the capacity of the server storage 418 is allocated to the sharing space 406.

In addition, the sharing space managing unit 402 may instruct the sharing space generating unit 404 to also perform access restriction such that only the representative user and the participating users can access the sharing space 406 which has been secured.

Next, the sharing space generating unit 404 generates authentication information for the first information communication apparatus 110 (representative user) and each of the second information communication apparatuses 111 (participating users) (S820).

Next, the sharing space generating unit 404 registers the address information and the authentication information of the first information communication apparatus 110 and each of the second information communication apparatuses 111 onto the authentication information registering unit 408 (S830).

Lastly, the sharing space generating unit 404 generates sharing space connection information which includes the sharing space address information and the authentication information, and transmits the sharing space connection information to the first information communication apparatus 110 (S840).

It is to be noted that the processing order of Step S810 to Step S840 is an example, and the order need not necessarily be the same as the order described above. Further, a plurality of steps may be executed in parallel.

It is to be noted that, as described above, when the server 120 does not include the sharing space managing unit 402, the sharing space generating unit 404 generates the sharing space 406 directly in the server storage 418 in Step S810. In addition, in this case, the sharing space generating unit 404 also performs the access restriction such that only the representative user and the participating users can access the sharing space 406 which has been secured.

[Transmitting Step of Sharing Space Individual Connection Information]

Next, the step of transmitting sharing space individual connection information (Step S530 in FIG. 5) will be described in detail.

Figure 9:
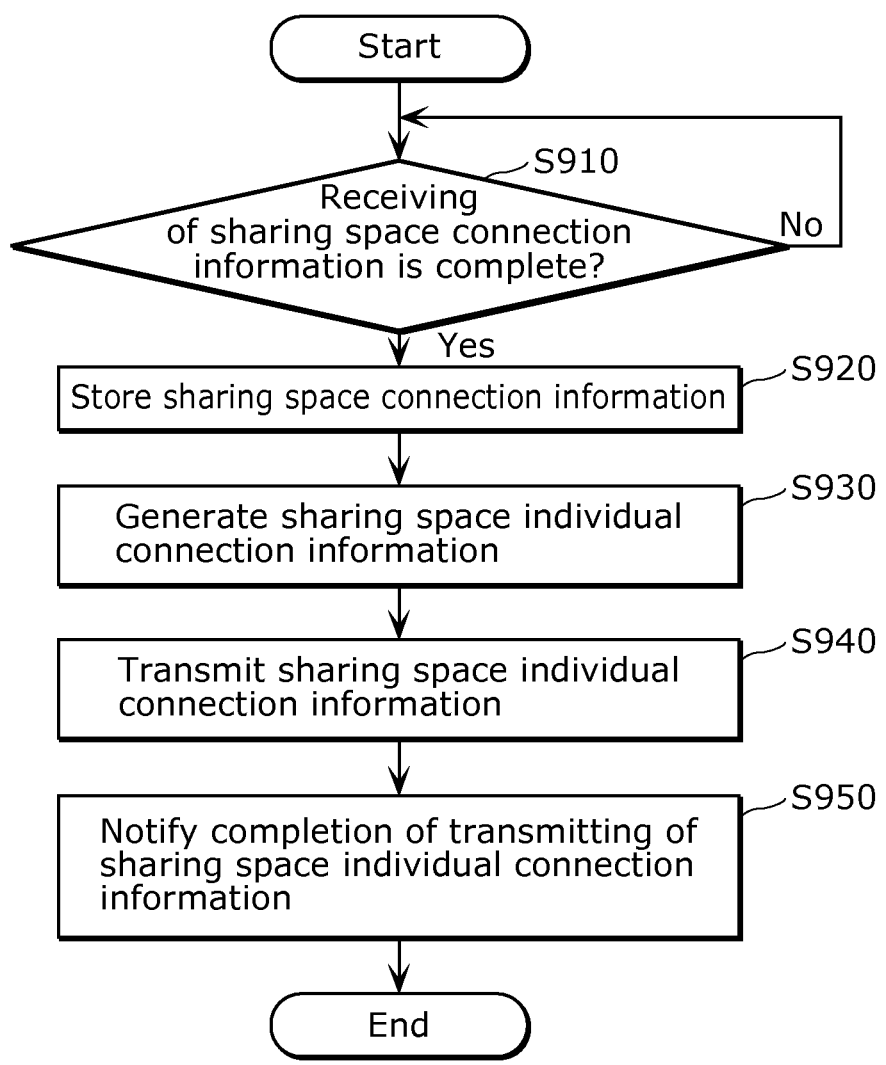
FIG. 9 is a flow chart of a sharing space individual connection information transmitting step.

FIG. 9 is a flow chart of the step of transmitting sharing space individual connection information.

The step of transmitting sharing space individual connection information is an operation performed mainly by the first information communication apparatus 110.

The step of transmitting sharing space individual connection information automatically starts in response to the reception of the sharing space connection information by the sharing space securing unit 208, without receiving an input from the representative user (Yes in S910).

The sharing space securing unit 208, after receiving the sharing space connection information, first stores the sharing space connection information in the first storage 206 (S920).

Next, the sharing space securing unit 208 generates the sharing space individual connection information (S930).

Here, when the sharing space individual connection information is transmitted and received via an e-mail, the e-mail indicated in FIG. 3B is generated. The sharing space securing unit 208 selectively extracts, from the sharing space connection information, the sharing space address information and the authentication information corresponding to the second information communication apparatuses 111, thereby generating the sharing space individual connection information corresponding one-to-one to each of the second information communication apparatuses 111.

Next, the sharing space securing unit 208 transmits, via the first communication unit 222, the sharing space individual connection information corresponding one-to-one to each of the second information communication apparatuses 111, based on the address information of the second information communication apparatuses 111 (S940).

It is to be noted that, the first information communication apparatus 110 may notify the representative user of the completion of the generation of the sharing space 406 at the end (S950). The notification may be performed, for example, on the integrated application which is dedicated to the content sharing system 100 mentioned in the description of the sharing space securement requesting step, or an application for editing content such as a picture.

It is to be noted that the processing order of Step S910 to Step S950 is an example, and the order need not necessarily be the same as the order described above. In addition, the steps which can be performed in parallel may be performed in parallel.

[Sharing Space Accessing Step]

Next, a sharing space accessing step (Step S540 in FIG. 5) will be described in detail.

Figure 10:
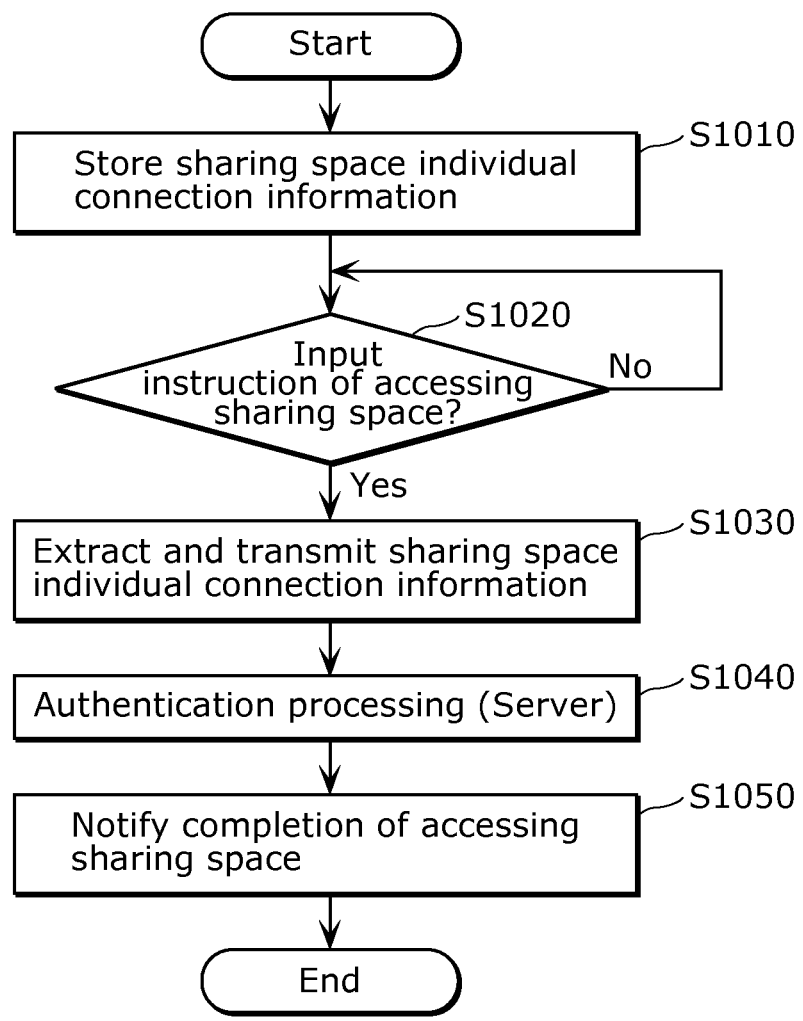
FIG. 10 is a flow chart of a sharing space accessing step.

FIG. 10 is a flow chart of a sharing space accessing step.

The sharing space accessing step is an operation performed mainly by the second information communication apparatuses 111.

First, the second communication unit 322 stores the sharing space individual connection information into the second storage 306 (S1010). Information to be stored as the sharing space individual connection information is the sharing space address information and the authentication information which are transmitted by the first information communication apparatus 110 in Step S940 of the step of transmitting the sharing space individual connection information, and received by the second communication unit 322. It is to be noted that the storing of the sharing space individual connection information may be performed every time the second communication unit 322 receives the sharing space individual connection information, or may be performed every predetermined time period.

The second communication unit 322, in response to the input, from a participating user, which is intended to access the sharing space 406 and which is received by the second input receiving unit 302 (Yes in S1020), extracts the sharing space individual connection information from the second storage 306, and transmits the extracted sharing space individual connection information to the server 120 (S1030).

More specifically, the second communication unit 322 accesses the server 120 based on the sharing space address information included in the extracted sharing space individual connection information, and transmits the authentication information to the authentication unit 412 of the server 120. It is to be noted that the process of Step S1030 may not be mainly performed by the second communication unit 322, as described above.

The input which is intended to access the sharing space 406 from a participating user may be a simple input of, for example, selecting a menu which requires access to the sharing space 406, on the integrated application which operates on the second information communication apparatus 111 and which is dedicated for the content sharing system 100. The menus which require access to the sharing space 406 include: uploading content; referring to content; downloading content; and so on.

Next, the authentication unit 412 of the server 120 checks the received authentication information against the information registered on the authentication information registering unit 408, and when the received authentication information matches the registered information, allows the second information communication apparatus 111 to access the sharing space 406 (S1040).

As described above, the second information communication apparatuses 111 accesses the sharing space 406 through the sharing space managing unit 402.

It is to be noted that, the second information communication apparatuses 111 may notify the participating users of the result of accessing the sharing space 406 at the end (S1050). This notification may be performed only when the access is allowed, or may be performed both when the access is allowed and when the access is not allowed. In addition, this notification may be performed on a application for editing a picture or content, which runs on the second information communication apparatus 111, for example.

It is to be noted that the processing order from Step S1010 to Step S1050 is an example, and thus the processing order need not necessarily be the same as the processing order described above. Further, a plurality of steps may be executed in parallel.

In addition, the processes from Step S1020 to Step S1040 may be performed every time the input which is intended to access the sharing space 406 is carried out. In this case, the access to the sharing space 406 may be terminated every time the execution of the menu which is selected by the user and requires access to the sharing space 406 is completed. In addition, the processes from Step S1020 to Step S1040 may be performed only when the menu which requires access to the sharing space 406 is selected during the period from the start-up to the shutdown of the integrated application. In this case, the access to the sharing space 406 may be maintained until the integrated application is shut down.

In addition, in the example shown in FIG. 10, Step S1030 and subsequent processes are performed so that the access to the server 120 is achieved, in response to the input of instructing access to the sharing space 406 in Step S1020. However, the input of instructing access to the sharing space 406 as in Step S1020 is not necessarily required for triggering execution of the processes for the access. For example, receiving the sharing space individual connection information in the second communication unit 322 may be the trigger, or passage of a predetermined amount of time or reaching a predetermined time may be the trigger as well.

It is to be noted that the operation performed when the first information communication apparatus 110 accesses the sharing space 406 is exactly the same as the operation performed in the above-described sharing space accessing step.

In addition, although it has been described that the second information communication apparatuses 111 accesses the sharing space 406 through the sharing space managing unit 402, the sharing space managing unit 402 may be omitted as described above. In this case, the second information communication apparatuses 111 access the sharing space 406 through the sharing space generating unit 404.

[Specifying the Volume of Content]

Next, specifying processing for the volume of content shared by the representative user and the participating users in the sharing space 406 will be described.

In the content sharing system 100 according to the exemplary embodiment, the first information communication apparatus 110 can specify the volume of content to be generated by the second information communication apparatuses 111. Here, the volume of content means the amount of information (data amount) of content. The processing of specifying the volume of content is performed as necessary in order to avoid the situation that a too large amount of information of content stored in the sharing space 406 overwhelms the capacity of the sharing space 406.

Figure 11:
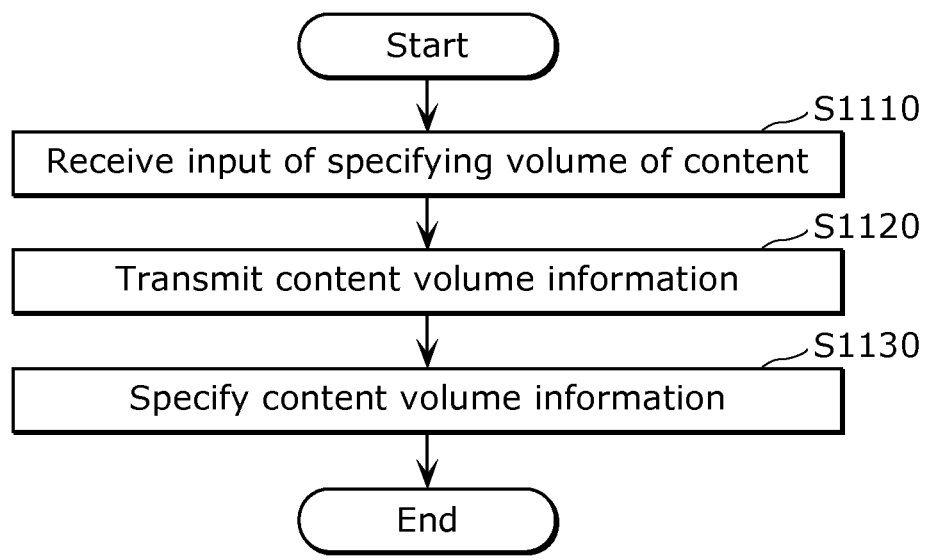
FIG. 11 is a flow chart which shows processing of specifying a volume of content.

FIG. 11 is a flow chart which shows the specifying processing for the volume of content.

First, the first input receiving unit 202 receives an input of generating content volume information which specifies the volume of content generated by the second content generating unit 320. This input is performed together with the input of requesting sharing space securement performed in Step S710 shown in FIG. 7. For example, the representative user performs input using the integrated application which is dedicated to the content sharing system 100. The content volume information is information which specifies a data size of a picture when the content is a picture, for example. In addition, resolution of a picture may be specified in place of the data size of a picture.

Next, the sharing space securing unit 208 transmits the content volume information to each of the second information communication apparatuses 111 together with the sharing space address information and the authentication information, via the first communication unit 222 (S1120).

More specifically, the content volume information is transmitted to each of the second information communication apparatuses 111 together with the sharing space individual connection information (the sharing space address information and the authentication information) in Step S940 in FIG. 9.

Next, the second communication unit 322 in the second information communication apparatus 111 transmits the received content volume information to the second content generating unit 320. This allows the second content generating unit 320 to generate content of the specified volume (S1130). It is to be noted that the process of Step S1130 may not be mainly performed by the second communication unit 322, as described above.

In addition, at this time, the second information communication apparatus 111 may send a notification to the participating user for requesting permission for specifying the volume of content.

It is to be noted that the specifying processing for the volume of content described above may be performed in the sharing space securement requesting step (Step S510 in FIG. 5). In this case, the content volume information may be included in the request information for sharing space securement and transmitted, or may be separately performed as a totally different process from the transmission of the request information for sharing space securement.

It is to be noted that the specifying of the volume of content may be performed by the server 120 instead of the first information communication apparatus 110.

To be specific, first, the sharing space generating unit 404 generates content volume information which specifies the volume of content generated by the second content generating unit 320, according to the generated capacity of the sharing space 406, in Step S840 shown in FIG. 8.

At this time, the content volume information is specified, for example, so that the content has the volume of lower than or equal to 0.1% of the capacity of the generated sharing space 406.

Next, the sharing space generating unit 404 transmits the content volume information together with the sharing space connection information (the sharing space address information and the authentication information) to the first information communication apparatus 110.

The subsequent processes are exactly the same as the processes of Step S1120 and Step S1130 shown in FIG. 11.

It is to be noted that the volume of the specified content may be arbitrarily changed by the participating users after specified.

[Generation and Upload of Content]

Next, generation processing and upload processing of content will be described in detail.

Here, examples of content generation include generation of image data performed by the capturing unit 212 when the capturing unit 212 is included as in FIG. 2A or FIG. 3A. In addition, the other examples of content generation include fabrication on the image data generated by the capturing unit 212, such as: changing the resolution; changing the color tone to sepia tone or monochrome; trimming a portion; and superimposing other image data or text data, to generate new image data. In addition, when content is generated by fabricating data, target data to be fabricated is not limited to the image data generated by the capturing unit 212, but may be the content data already stored in the first information communication apparatus 110 or the second information communication apparatuses 111, such as a captured picture. In addition, the content to be generated is not limited to an image but may be text data, audio data, or a combination of any data items described above.

Figure 12:
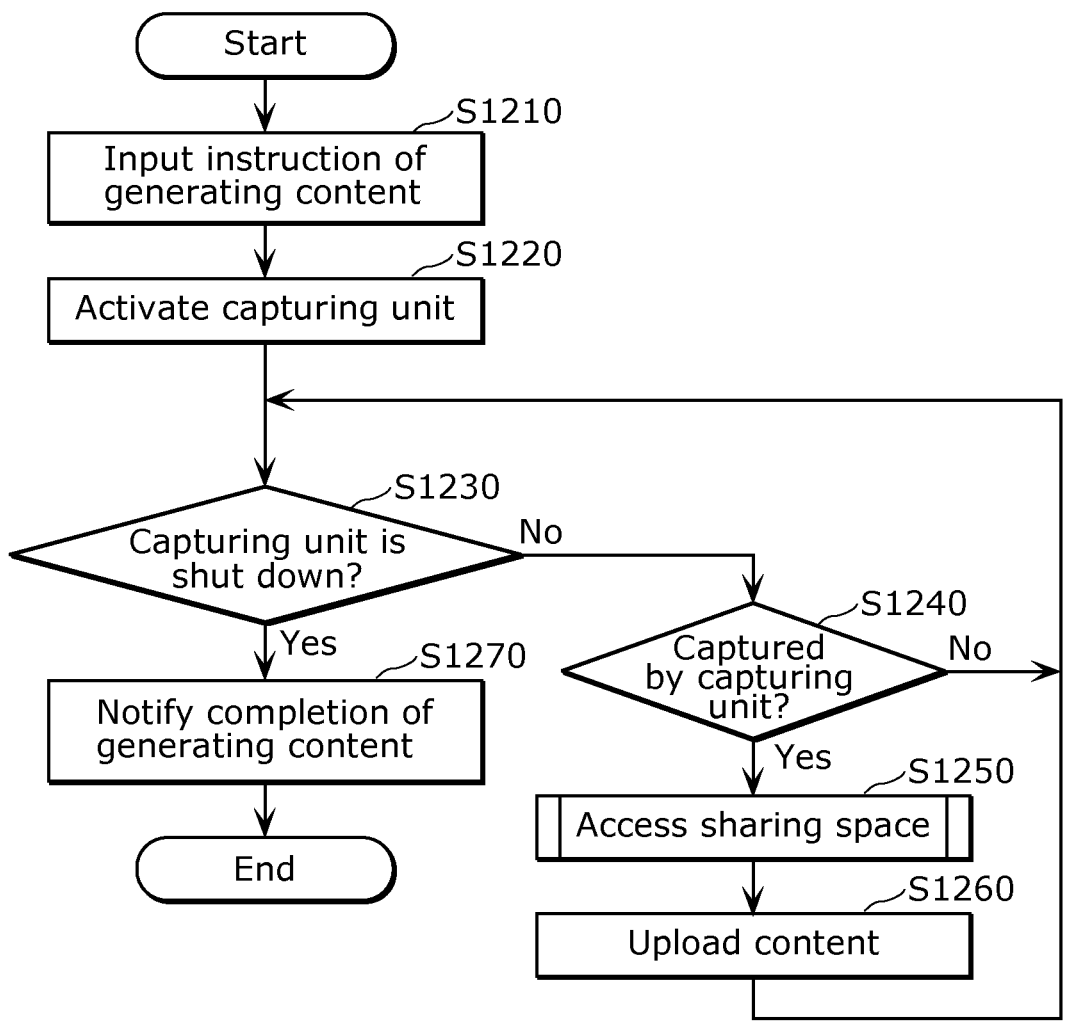
FIG. 12 is a flowchart of a content uploading process.

FIG. 12 is a flowchart of the processes of generation and upload of content. It is to be noted that although FIG. 12 describes the operation of the second information communication apparatus 111, the operation is exactly the same as the operation of the first information communication apparatus 110.

According to the exemplary embodiment, when content to be uploaded to the sharing space 406 is generated, the access processing to the server 120 shown in FIG. 10 is performed every time content is generated.

First, the operation of the second information communication apparatus 111 will be described with reference to FIG. 12.

First, when the second input receiving unit 302 receives an input of generating content from the representative user (S1210), the second content generating unit 320 starts up the capturing unit 212 (S1220).

More specifically, for example, the capturing unit 212 is started up by selecting an icon for starting up the capturing unit 212 on the above-described integrated application.

Subsequently, while the capturing unit 212 is running (No in S1230), the second information communication apparatus 111 determines whether or not content is captured by the capturing unit 212 (S1240).

Here, to capture content by the capturing unit 212 means that the participating user presses a shutter button to actually capture a picture. In addition, when the second content generating unit 320 has already received the content volume information, the resolution at the time when the capturing unit 212 captures a picture may be set such that the data size is smaller than or equal to the data size specified in the content volume information.

While the capturing unit 212 is running, the process of accessing the sharing space 406 is performed (S1250) every time the capturing unit 212 captures content (Yes in S1240).

More specifically, in Step S1250, the processes from Step S1030 to Step S1050 are performed. Next, the second communication unit 322 uploads the captured content to the sharing space 406 (S1260). It is to be noted that the uploading of content performed by the second communication unit 322 is performed, for example, in response to an instruction of the uploading unit which is not illustrated and which is included in the second information communication apparatus 111 as described above.

In addition, at this time, every time the capturing unit 212 captures content, the second information communication apparatus 111 may seek permission to the participating user for uploading the captured content. With this, the participating user can select whether or not to upload the captured content on a case-by-case basis.

Then, when the capturing unit 212 is shut down (Yes is S1230), the second information communication apparatus 111 notifies the participating user of the completion of capturing of content (S1270), and ends the uploading process of the content. It is to be noted that the notification process in Step S1270 may be omitted, and the content uploading process may be ended when the capturing unit 212 is shut down.

It is to be noted that, at the time of the uploading process of the content shown in Step S1260, the server 120 may notify the second information communication apparatuses 111 of completion of the uploading of the content. In addition, the completion of the uploading of the content may also be notified to the first information communication apparatus 110 and the other second information communication apparatuses 111 than the second information communication apparatus 111 that uploaded the content.

It is to be noted that the exactly the same uploading process is performed when the first information communication apparatus 110 uploads content.

Furthermore, the processing order from Step S1210 to Step S1270 is an example, and thus the processing order need not necessarily the same as the processing order described above. Further, a plurality of steps may be executed in parallel.

[Download of Content]

When one of the second information communication apparatuses 111 downloads content, the participating user inputs an instruction of downloading content which is sent to the first input receiving unit 202, while the sharing space 406 is being accessed by the second information communication apparatus 111. In addition, after downloading of the content is completed, the second information communication apparatus 111 may notify the participating user of the completion of capturing the content.

Furthermore, it is of course possible to directly view the content on the sharing space 406 without downloading the content, or directly edit the content on the sharing space 406 without downloading the content.

It is to be noted that the same operation is performed when the representative user downloads or edits content on the first information communication apparatus 110.

[Modification 1]

In the case where the first information communication apparatus 110 is a smartphone provided with a capturing function and an e-mail software installed, the address information storage 204 in the first information communication apparatus 110 can be implemented using an address book in the e-mail software. In addition, the capturing unit 212 can be implemented using a camera. The same holds true for the second information communication apparatuses 111.

[Modification 2]

The authentication unit 412 in the server 120 may authenticate the second information communication apparatuses 111 using information specified by the representative user (specified information) in addition to the authentication information, in the sharing space accessing step (Step S540 in FIG. 5). Here, the information specified by the representative user is, for example, the address information of the first information communication apparatus 110, a keyword determined in advance between the representative user and the participating users, a picture of a specified object, and so on.

In this case, the sharing space securing unit 208 of the first information communication apparatus 110 transmits, to the server 120, the request information for sharing space securement with the keyword determined between the representative user and the participating users or the picture of a specific object added thereto, in the sharing space securement requesting step (Step S510 in FIG. 5). In addition, the second communication unit 322 of the second information communication apparatus 111 transmits, in addition to the authentication information, the address information of the first information communication apparatus 110, the keyword determined between the representative user and the participating users, or the picture of a specific object, in the sharing space accessing step (Step S540 in FIG. 5).

Furthermore, the second communication unit 322 of the second information communication apparatus 111 may execute the processing of the sharing space accessing step only when the address information of the first information communication apparatus 110 which has generated the sharing space 406 is stored in the second information communication apparatus 111.

With this, it is possible to prevent the participating users from accessing the sharing space 406 generated by a representative user who is unknown by the participating users.

[Modification 3]

In the sharing space generating step (Step S520 in FIG. 5), when the sharing space generating unit 404 of the server 120 generates the authentication information, the authentication information need not necessarily be allocated on a one-to-one basis to the first information communication apparatus 110 and the second information communication apparatuses 111. For example, one item of the authentication information may be commonly used by the second information communication apparatuses 111. In addition, the sharing space generating unit 404 may generate the authentication information in the same number as the total number of the second information communication apparatuses 111, and the first information communication apparatus 110 may determine allocation of the authentication information to distribute to the second information communication apparatuses 111.

This modification can be applied to the case where, for example, a plurality of users who use the sharing space 406 share a singe item of the authentication information. In this case, the sharing space generating unit 404, for example, manages information related to the number of terminals or the number of users which can be authenticated by the singe item of the authentication information, in association with the authentication information, in the authentication information registering unit 408. Then, the authentication unit 412 counts the number of the terminals or the number of the users whose authentication for using the sharing space 460 have been successful, and denies authentication when the number of authentication exceeds the number of the terminals or the number of the users that can be authenticated. It is to be noted that the number of the terminals or the number of the users that can be authenticated by a singe item of the authentication information may be, for example, specified by the representative user when requesting generation of the sharing space 406.

This allows the first information communication apparatus 110 to distribute the authentication information to the second information communication apparatuses 111 without associating the authentication information with the second information communication apparatuses 111, and thus facilitates distribution of the authentication information.

[Modification 4]

The first communication unit 222 of the first information communication apparatus 110, in the step of transmitting sharing space individual connection information (Step S530 in FIG. 5), may transmit the sharing space individual connection information directly to the second communication unit 322 of the second information communication apparatus 111 without using the address information associated with the second information communication apparatus 111. The methods of a direct transmission may include, for example, short distance wireless communication such as RFID (radio frequency identification), communication using an infrared ray or Bluetooth (registered trademark), or use of a QR code (registered trademark).

This enables direct distribution of the authentication information without being routed through the Internet or a server, and thus it is possible to lower the risk of leakage of the authentication information.

It is to be noted that, in this case, the address information associated with the second information communication apparatus 111 need not necessarily be included in the request information for sharing space securement, in the sharing space securement requesting (Step S510 in FIG. 5).

[Other Modification]

It is to be noted that the present invention can be modified as below.

(1) Each of the aforementioned apparatuses can be implemented, specifically, as a computer system including a microprocessor, a ROM, a RAM, a hard disk unit, a display unit, a keyboard, a mouse, and so on. A computer program is stored in the RAM or hard disk unit. Each of the apparatuses achieves its function through the microprocessor's operation according to the computer program. Here, the computer program is configured by combining plural instruction codes indicating instructions for the computer in order to achieve predetermined functions.

(2) A part or all of the constituent elements constituting the respective apparatuses may be configured from a single System-LSI (Large-Scale Integration). The System-LSI is a super-multi-function LSI manufactured by integrating constituent units on one chip, and is specifically a computer system configured by including a microprocessor, a ROM, a RAM, and so on. A computer program is stored in the ROM. The System—LSI achieves its function through the microprocessor's operation of loading a computer program from the ROM to the RAM, and performing an operation such as computing according to the computer program which has been loaded.

(3) A part or all of the constituent elements constituting the respective apparatuses may be configured as an IC card which can be attached and detached from the respective apparatuses or as a stand-alone module. The IC card or the module is a computer system configured from a microprocessor, a ROM, a RAM, and so on. The IC card or the module may also include the aforementioned super-multi-function LSI. The IC card or the module achieves its function through the microprocessor's operation according to the computer program. The IC card or the module may also be implemented to be tamper-resistant.

(4) The present invention may be implemented as the method described above. In addition, the present invention may be a computer program which causes a computer to execute these methods, and may also be a digital signal including the computer program.

In addition, the present invention may also be realized by storing the computer program or the digital signal in a computer readable recording medium such as flexible disc, a hard disk, a CD-ROM, an MO, a DVD, a DVD-ROM, a DVD-RAM, a BD (Blu-ray Disc), a semiconductor memory. In addition, the present invention may also include the above-described digital signal recorded in these recording media.

In addition, the present invention may also be realized by the transmission of the aforementioned computer program or digital signal via a telecommunication line, a wireless or wired communication line, a network represented by the Internet, a data broadcast and so on.

In addition, the present invention may also be a computer system including a microprocessor and a memory, in which the memory stores the aforementioned computer program and the microprocessor operates according to the computer program.

In addition, by transferring the program or the digital signal by recording onto the aforementioned recording media, or by transferring the program or digital signal via the aforementioned network and the like, implementation using another independent computer system is also made possible.

(5) Each of the exemplary embodiments described above may be applied to each of the modifications described above.

Advantageous Effect

The content sharing system according to an aspect of the present invention has been described based on the exemplary embodiment.

According to the present invention, a single information communication apparatus secures a sharing space on the server, obtains authentication information of each of the information communication apparatuses which share content therebetween, and transmits the authentication information to each of the information communication apparatuses. With this, it is possible for a user to share content with a simple operation without registering user information on a predetermined server or service in advance.

It is to be noted that the present invention is not limited to the exemplary embodiment or the modifications thereof. Other forms in which various modifications apparent to those skilled in the art are applied to the exemplary embodiment or the modifications thereof, or forms structured by combining elements of different embodiments and modifications thereof are included within the scope of the present invention, unless such changes and modifications depart from the scope of the present invention.

INDUSTRIAL APPLICABILITY

With the content sharing system according to the present invention, it is possible for a user to share content with a simple operation without registering user information on a predetermined server or service in advance. It is therefore useful as an information system in which content is shared between plural users.

REFERENCE SIGNS LIST 110 first information communication apparatus
111 second information communication apparatus
120 server
202 first input receiving unit
204 address information storage
206 first storage
208 sharing space securing unit
212 capturing unit
220 first content generating unit
222 first communication unit
302 second input receiving unit
306 second storage
320 second content generating unit
322 second communication unit
402 sharing space managing unit
404 sharing space generating unit
406 sharing space
408 authentication information registering unit
412 authentication unit
418 server storage

The invention claimed is:

1. A content sharing system, comprising:
a server;
a first information communication apparatus; and
one or more second information communication apparatuses,
wherein content is shared using the first information communication apparatus and at least one of the second information communication apparatuses, in a sharing space which is a part of a storage region on the server, at least between a first user who uses the first information communication apparatus and a second user who uses the second information communication apparatus,
the first information communication apparatus includes:
a first processor; and
a first non-transitory computer-readable medium having stored thereon first executable instructions that, when executed by the first processor, cause the first information communication apparatus to:
transmit address information and sharing space securement information to the server, and receive authentication information and sharing space address information from the server, the address information being associated with the second information communication apparatus, the sharing space securement information including information for specifying a storage capacity of the part of the storage region as the sharing space on the server, the authentication information being for enabling the second user to access the sharing space using the second information communication apparatus, the sharing space address information representing an address of the sharing space allocated based on the sharing space securement information; and after receiving the sharing space address information and the authentication information from the server, transmit the authentication information together with the sharing space address information to the second information communication apparatus corresponding to the authentication information, the server includes:

a second processor; and a second non-transitory computer-readable medium having stored thereon second executable instructions that, when executed by the second processor, cause the server to:

allocate the sharing space for storage of the content, the content including at least content of the first user and content of the second user, and generate the sharing space address information in the part of the storage region on the server based on the sharing space securement information received from the first information communication apparatus, generate the authentication information, and transmit the sharing space address information and the authentication information to the first information communication apparatus; and authenticate the authentication information received from the second information communication apparatus, and allow the second information communication apparatus to access the sharing space, wherein the sharing space securement information includes information for specifying a term of validity of the sharing space, and the second executable instructions, when executed by the second processor, cause the server to generate the term of validity which is specified by the sharing space securement information, and the second information communication apparatus includes:

a second storage;

a third processor; and a third non-transitory computer-readable medium having stored thereon third executable instructions that, when executed by the third processor, cause the second information communication apparatus to:

receive the sharing space address information and the authentication information from the first information communication apparatus;

store, in the second storage, the received sharing space address information and authentication information, and extract the authentication information from the second storage, and transmit the authentication information to the server based on the sharing space address information stored in the second storage, to access the sharing space.

2. The content sharing system according to claim 1, wherein the first executable instructions, when executed by the first processor, cause the first information communication apparatus to transmit, based on the address information, the authentication information together with the sharing space address information, to the second information communication apparatus corresponding to the authentication information.

3. The content sharing system according to claim 1, wherein the first executable instructions, when executed by the first processor, cause the first information communication apparatus to further receive an input of at least the first user and specified information used for accessing the sharing space, and transmit the sharing space securement information including the received specified information, and the third executable instructions, when executed by the third processor, cause said second information communication apparatus to further receive an input of at least the second user and information corresponding to the specified information, and transmit the authentication information including the received information.

4. The content sharing system according to claim 1, wherein the third executable instructions, when executed by the third processor, cause the second information communication apparatus to further generate the content of the second user to be uploaded to the sharing space.

5. The content sharing system according to claim 4, wherein the first executable instructions, when executed by the first processor, cause the first information communication apparatus to further receive an input of at least the first user, generate, based on the received input, content volume information for specifying a volume of the content of the second user to be generated by the second information communication apparatus, and transmit the content volume information to the second information communication apparatus together with the sharing space address information and the authentication information, and the third executable instructions, when executed by the third processor, cause the second information communication apparatus to generate the content of the second user of the volume specified by the content volume information.

6. The content sharing system according to claim 4, wherein the second executable instructions, when executed by the second processor, cause the server to generate, based on the specified storage capacity of the allocated sharing space, content volume information for specifying a volume of the content of the second user to be generated by the second information communication apparatus, and transmit the generated content volume information together with the sharing space address information and the authentication information, to the first information communication apparatus, the first executable instructions, when executed by the first processor, cause the first information communication apparatus to transmit the content volume information received from the server, to the second information communication apparatus together with the sharing space address information and the authentication information, and the third executable instructions, when executed by the third processor, cause the second information communication apparatus to generate the content of the second user of the volume specified by the content volume information.

7. The content sharing system according to claim 3, wherein the third executable instructions, when executed by the third processor, cause the second information communication apparatus to further generate the content of the second user to be uploaded to the sharing space, when an input of an instruction on generation of the content of the second user is received, generate the content of the second user, and every time the content of the second user is generated, the sharing space is accessed to upload the generated content of the second user to the sharing space.

8. The content sharing system according to claim 1,
wherein the address information is an e-mail address available to the second information communication apparatus.

9. The content sharing system according to claim 1,
wherein the first information communication apparatus further includes an address information storage in which the address information is stored, and
the first executable instructions, when executed by the first processor, cause the first information communication apparatus to select the address information stored in the address information storage and transmit the selected address information to the server.

10. The content sharing system according to claim 1,
wherein the first information communication apparatus further includes a first storage into which the sharing space address information and the authentication information received from the server is stored, and
the first executable instructions, when executed by the first processor, cause the first information communication apparatus to extract the authentication information from the first storage, and transmit the authentication information to the server based on the sharing space address information stored in the first storage, to access the sharing space.

11. The content sharing system according to claim 3,
wherein the first executable instructions, when executed by the first processor, cause the first information communication apparatus to further generate the content of the first user, and
when an input of an instruction on generation of the content of the first user is received,
generate the content of the first user, and
every time the content of the first user is generated, access the sharing space to upload the generated content of the first user to the sharing space.

12. A content sharing method for sharing content, using a first information communication apparatus and one or more second information communication apparatuses, in a sharing space which is a part of a storage region on a server, at least between a first user who uses the first information communication apparatus and a second user who uses a corresponding one of the second information communication apparatuses, the content sharing method comprising:
transmitting address information and sharing space securement information to the server, and receiving authentication information and sharing space address information from the server, the transmitting and the receiving being performed by the first information communication apparatus, the address information being associated with the second information communication apparatus, the sharing space securement information including information for specifying a storage capacity of the part of the storage region as the sharing space on the server, the authentication information being for enabling the second user to access the sharing space using the second information communication apparatus, the sharing space address information representing an address of the sharing space allocated based on the sharing space securement information;
after the sharing space address information and the authentication information are received from the server, transmitting the authentication information together with the sharing space address information to the second information communication apparatus corresponding to the authentication information, the transmitting of the authentication information being performed by the first information communication apparatus;
allocating the sharing space for storage of the content, the content including at least content of the first user and content of the second user, and generating the sharing space address information in the part of the storage region on the server based on the sharing space securement information received from the first information communication apparatus, generating the authentication information, and transmitting the sharing space address information and the authentication information to the first information communication apparatus, the generating and transmitting being performed by the server;
authenticating the authentication information received from the second information communication apparatus, allowing the second information communication apparatus to access the sharing space, the authenticating and allowing being performed by the server, the sharing space securement information including information for specifying a term of validity of the sharing space, and the server generating the term of validity which is specified by the sharing space securement information;
receiving the sharing space address information and the authentication information from the first information communication apparatus, and storing the received sharing space address information and the authentication information into a second storage, the receiving and storing being performed by the second information communication apparatus; and
extracting the authentication information and the sharing space address information from the second storage, and accessing the sharing space based on the authentication information and the sharing space address information, the extracting and accessing being performed by the second information communication apparatus.

* * * * *